(12) United States Patent
Oinuma et al.

(10) Patent No.: US 10,710,908 B2
(45) Date of Patent: Jul. 14, 2020

(54) WATER TREATMENT DEVICE AND WATER TREATMENT METHOD

(71) Applicant: Mitsubishi Electric Corporation, Chiyoda-ku (JP)

(72) Inventors: Gaku Oinuma, Chiyoda-ku (JP); Teruki Naito, Chiyoda-ku (JP); Yasutaka Inanaga, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 109 days.

(21) Appl. No.: 15/765,660

(22) PCT Filed: Sep. 14, 2016

(86) PCT No.: PCT/JP2016/077107
§ 371 (c)(1),
(2) Date: Apr. 3, 2018

(87) PCT Pub. No.: WO2017/110165
PCT Pub. Date: Jun. 29, 2017

(65) Prior Publication Data
US 2019/0077683 A1    Mar. 14, 2019

(30) Foreign Application Priority Data

Dec. 24, 2015    (JP) ................................ 2015-250793

(51) Int. Cl.
*C02F 1/46*      (2006.01)
*C02F 1/74*      (2006.01)
(Continued)

(52) U.S. Cl.
CPC .......... *C02F 1/4608* (2013.01); *B01J 19/088* (2013.01); *C02F 1/4672* (2013.01); *C02F 1/74* (2013.01);
(Continued)

(58) Field of Classification Search
CPC .......... C02F 1/46; C02F 1/4608; C02F 1/461; C02F 1/46104; C02F 1/46106;
(Continued)

(56) References Cited

U.S. PATENT DOCUMENTS

| 10,093,566 B2 * | 10/2018 | Oinuma ................... C02F 1/36 |
| 2005/0189278 A1 * | 9/2005 | Iijima .................... B01J 19/088 |
| | | 210/192 |
| 2010/0239473 A1 | 9/2010 | Iijima et al. |

FOREIGN PATENT DOCUMENTS

| JP | 2001-070946 A | 3/2001 |
| JP | 2005-296909 A | 10/2005 |

(Continued)

OTHER PUBLICATIONS

International Search Report dated Dec. 13, 2016, in PCT/JP2016/077107 filed Sep. 14, 2016.
(Continued)

*Primary Examiner* — Natasha E Young
(74) *Attorney, Agent, or Firm* — Xsensus LLP

(57) ABSTRACT

A water treatment device includes a grounding electrode having a planar flowing water portion that causes treatment target water to flow, a multiple of wire form high voltage electrodes provided parallel with the flowing water portion in a position distanced from the flowing water portion of the grounding electrode and to extend in a direction intersecting a flow direction of the treatment target water, and a blowing device that forms a gas flow that intersects an extension direction of the high voltage electrode and intersects an extension direction of an electrical discharge. This kind of configuration is such that even when water droplets adhere to the high voltage electrode, the water droplets are blown away by a pressure of the gas flow formed by the blowing device, and a spark discharge is restricted.

18 Claims, 14 Drawing Sheets

(51) Int. Cl.
*C02F 1/78* (2006.01)
*B01J 19/08* (2006.01)
*C02F 1/467* (2006.01)
*C02F 1/72* (2006.01)
*C02F 1/461* (2006.01)

(52) U.S. Cl.
CPC .......... *B01J 2219/0809* (2013.01); *B01J 2219/0828* (2013.01); *C01B 2201/32* (2013.01); *C01B 2201/64* (2013.01); *C02F 1/722* (2013.01); *C02F 1/78* (2013.01); *C02F 2001/46152* (2013.01); *C02F 2201/007* (2013.01); *C02F 2201/4611* (2013.01); *C02F 2201/46175* (2013.01); *C02F 2201/782* (2013.01); *C02F 2201/784* (2013.01); *C02F 2305/023* (2013.01)

(58) Field of Classification Search
CPC ....... C02F 1/467; C02F 1/4672; C02F 1/72; C02F 1/722; C02F 1/74; C02F 1/78; C02F 2001/46152; C02F 2201/00; C02F 2201/002; C02F 2201/007; C02F 2201/461–4611; C02F 2201/4616; C02F 2201/46175; C02F 2201/78; C02F 2201/782; C02F 2201/784; C02F 2305/00–023; B01J 19/00; B01J 19/08; B01J 19/087; B01J 19/088

See application file for complete search history.

(56) References Cited

FOREIGN PATENT DOCUMENTS

| JP | 2007-038110 A | 2/2007 |
| JP | 2013-206767 A | 10/2013 |
| JP | 6104466 B1 | 3/2017 |
| WO | WO 2015/111465 A1 | 7/2015 |
| WO | WO 2016/117259 A1 | 7/2016 |
| WO | WO 2016/117260 A1 | 7/2016 |

OTHER PUBLICATIONS

Qinuma, G. et al., "Comparison of Aqueous Organics Degradation by Plasma on Flowing Water Surface and $O_3/H_2O_2$ Advanced Oxidation Process", 23$^{rd}$ International Symposium on Plasma Chemistry, (2017), 2 pages.

* cited by examiner

WATER TREATMENT DEVICE AND WATER TREATMENT METHOD

This application is a national stage application claiming priority to PCT/JP2016/077107, now WO 2017/110165, filed on Sep. 14, 2016, which claims priority to Japanese Patent Application Serial No. JP 2015-250793, filed on Dec. 24, 2015.

TECHNICAL FIELD

The present invention relates to a water treatment device that treats treatment target water using ozone, a radical, or the like generated by an electrical discharge, and to a water treatment method.

BACKGROUND ART

An ozone treatment device is known as an existing water treatment device, but a persistent substance that cannot be removed using an existing ozone treatment device may be included in industrial waste water or the like. In particular, removal of dioxins, a dioxane, and the like, is a considerable problem. In response to this kind of problem, a method whereby a hydroxyl radical (OH), which is more highly active than ozone, is generated in treatment target water by combining ozone ($O_3$) and hydrogen peroxide ($H_2O_2$) or ultraviolet light, and removal of a persistent substance is carried out, has been partly put to practical use. However, this method is such that device cost and operating cost are extremely high, and the reality is that the method is not widespread.

Also, a method whereby a hydroxyl radical, or the like, generated by an electrical discharge is caused to act directly on treatment target water, thereby removing a persistent substance, has been proposed as another method. For example, in Patent Document 1, a water treatment system including a multiple of hollow cylindrical discharge electrodes is such that gas is caused to flow in a hollow portion of the discharge electrode, and a gas including a radical obtained by an electrical discharge being carried out in a vicinity of a gas ejection is ejected into treatment target water, whereby a persistent organic substance, or the like, dissolved in the water is treated so as to degrade. Also, a purifying device presented in Patent Document 2 is such that positive and negative electrodes are disposed with spaces between each other in a treatment space, and an electrical discharge is carried out in a state wherein a treatment target article is in contact with one of the electrodes, thereby purifying the treatment target article.

CITATION LIST

Patent Literature

Patent Document 1: JP-A-2005-296909
Patent Document 2: JP-A-2001-70946

SUMMARY OF INVENTION

Technical Problem

However, a water treatment device configured as in Patent Document 1 is such that a leading end of an electrode of a pointed hollow cylindrical structure is oriented toward treatment target water, and an electrical discharge is formed in a vicinity of the leading end of the electrode, because of which there is a problem in that contact between the electrical discharge and the treatment target water is limited to a narrow region corresponding to the leading end of the electrode, and water treatment speed is low.

Also, a purifying device configured as in Patent Document 2 is such that an electrical discharge is formed between a plate form electrode in contact with a treatment target matter in an interior of a box body and a multiple of linear electrodes disposed across a space from the plate form electrode, but when the treatment target matter is water, water droplets may adhere to the linear electrodes due to the water splashing when being introduced and to condensation in the box body interior. When water droplets adhere to the linear electrodes, the interval between the linear electrodes and the plate form electrode becomes locally narrower, because of which a spark discharge is liable to occur in the narrowed portion. There is a problem in that water treatment performance decreases due to local heating caused by the spark discharge and to an electrical discharge non-uniformity, and furthermore, the spark discharge causes breakage of the linear electrodes.

The invention, having been contrived in order to resolve the previously described kinds of problem, has an object of providing a water treatment device and a water treatment method such that highly efficient water treatment is realized, and breakage of an electrode is restricted, by restricting an occurrence of a spark discharge, and removal of organic matter in treatment target water can be carried out quickly and efficiently.

Solution to Problem

A water treatment device according to the invention includes a grounding electrode having a planar flowing water portion that causes treatment target water to flow, a multiple of high voltage electrodes provided parallel with the flowing water portion in a position distanced from the flowing water portion of the grounding electrode and so as to extend in a direction intersecting a flow direction of the treatment target water, a frame having a gas supply port that supplies a gas that generates a radical owing to an electrical discharge between the grounding electrode and the high voltage electrode, and a supply port and a discharge port of the treatment target water, and housing the grounding electrode and the high voltage electrode, and blowing means that induces a gas flow in an interior of the frame, wherein the blowing means forms a gas flow with respect to an electrical discharge region from the high voltage electrode to a surface of the treatment target water on the flowing water portion, the gas flow intersecting an extension direction of the high voltage electrode and intersecting with extension direction of the electrical discharge which formed from the high voltage electrode to the surface of the treatment target water on the flowing water portion.

Also, a water treatment method according to the invention is a water treatment method whereby treatment target water and a gas that generates a radical owing to an electrical discharge are supplied to an interior of a frame in which a grounding electrode and a high voltage electrode are housed, an electrical discharge is generated between the grounding electrode and the high voltage electrode, and organic matter in the treatment target water is degraded and removed by a radical generated by the electrical discharge, the water treatment method including a step of causing the treatment target water to flow over a planar flowing water portion of the grounding electrode, a step of applying a voltage to a multiple of the high voltage electrode provided parallel with the flowing water portion in a position distanced from the flowing water portion of the grounding electrode and so as to extend in a direction intersecting a flow direction of the treatment target water, thereby generating the electrical discharge between the grounding electrode and the multiple of the high voltage electrode, and a step of forming a gas flow with respect to an electrical discharge region from the high voltage electrode to a surface of the treatment target water on the flowing water portion, the gas flow intersecting an extension direction of the high voltage electrode and intersecting with extension direction of the electrical discharge which formed from the high voltage electrode to the surface of the treatment target water on the flowing water portion.

Advantageous Effects of Invention

The water treatment device according to the invention is such that a gas flow is formed to intersect an extension direction of a high voltage electrode and intersect an extension direction of an electrical discharge formed from the high voltage electrode to a surface of treatment target water on a flowing water portion, because of which, even when water droplets adhere to the high voltage electrode when the electrical discharge is generated, the water droplets are blown away by a pressure of the gas flow formed by the blowing means, and a spark discharge is restricted. Because of this, a uniform electrical discharge is formed along the high voltage electrode, and the electrical discharge comes into contact with the treatment target water over a wide area, because of which removal of organic matter in the treatment target water can be carried out quickly and efficiently, and breakage of the high voltage electrode is restricted.

Also, the water treatment method according to the invention is such that a gas flow is formed intersecting an extension direction of a high voltage electrode and intersecting an extension direction of an electrical discharge formed from the high voltage electrode to a surface of treatment target water on a flowing water portion, because of which, even when water droplets adhere to the high voltage electrode when the electrical discharge is generated, the water droplets are blown away by a pressure of the gas flow formed by the blowing means, and a spark discharge is restricted. Because of this, a uniform electrical discharge is formed along the high voltage electrode, and the electrical discharge comes into contact with the treatment target water over a wide area, because of which removal of organic matter in the treatment target water can be carried out quickly and efficiently, and breakage of the high voltage electrode is restricted.

Other objects, characteristics, aspects, and advantages of the invention will become more apparent from the following detailed description of the invention, which refers to the drawings.

BRIEF DESCRIPTION OF DRAWINGS

FIG. 2 is a diagram

DESCRIPTION OF EMBODIMENTS

First Embodiment

Figure 1:
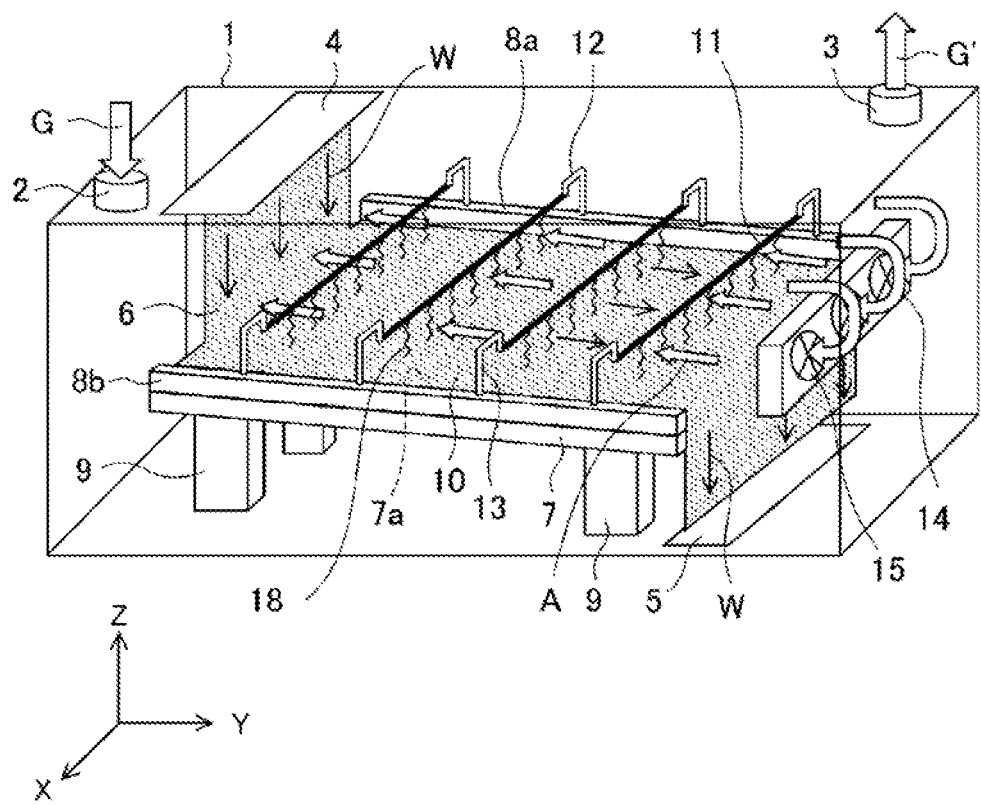
FIG. 1 is a perspective view showing a main configuration of a water treatment device according to a first embodiment of the invention.
Figure 2A:
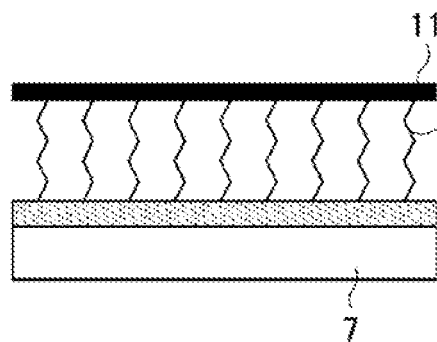
FIG. 2A and FIG. 2B are diagrams illustrating an aspect of an electrical discharge in the water treatment device according to the first embodiment of the invention.
Figure 2B:
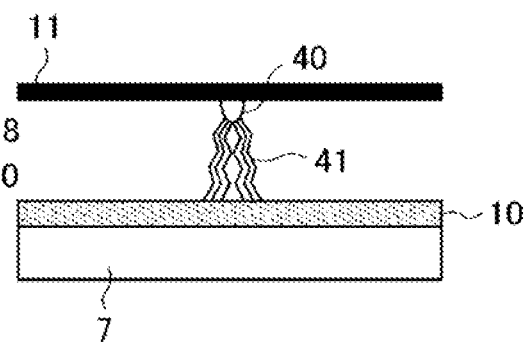
Figure 3:
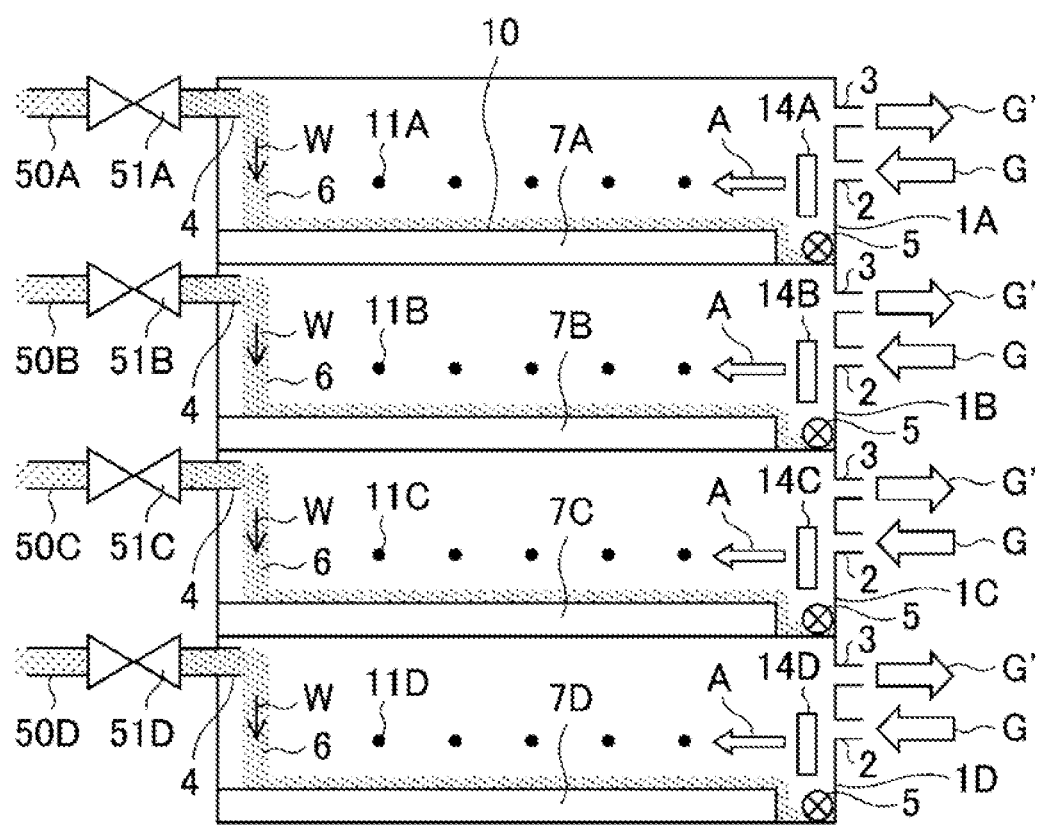
FIG. 3 is a sectional view showing a modified example of the water treatment device according to the first embodiment of the invention.

Hereafter, a water treatment device according to a first embodiment of the invention will be described, based on the drawings. FIG. 1 is a perspective view schematically showing a main configuration of the water treatment device according to the first embodiment, and in FIG. 1, for the sake of convenience, a treatment tank 1 is shown as being transparent in order that an interior can be seen through the treatment tank 1. Also, FIG. 2A and FIG. 2B, beings diagrams that schematically illustrates an aspect of an electrical discharge in the water treatment device according to the first embodiment, shows a cross-section of an X-Z face in FIG. 1. Also, FIG. 3 is a sectional view schematically showing a modified example of the water treatment device according to the first embodiment. In the drawings, the same reference signs are allotted to elements having the same or corresponding functions.

Also, in the drawings, an arrow indicated by W, and an arrow the same as this, indicates a flow of treatment target water 6 (and water after treatment), an arrow indicated by G indicates oxygen gas supplied from a gas supply port 2 to an inside of the treatment tank 1, and an arrow indicated by G' indicates exhaust gas discharged from inside the treatment tank 1 through a gas discharge port 3. Also, a white arrow indicated by A, and a white arrow of the same thickness, indicates a gas flow inside the treatment tank 1, and in particular, indicates a gas flow (hereafter, this is referred to as gas flow A) intentionally formed using blowing means such as a blowing device 14.

As shown in FIG. 1, the gas supply port 2 and the gas discharge port 3 are included in an upper face of the treatment tank 1, which is a frame formed in a box form. Also, a water supply port 4 for introducing the treatment target water 6 is included in the upper face of the treatment tank 1, and a water discharge port 5 through which water after treatment is discharged to an exterior of the treatment tank 1 is provided in a bottom face of the treatment tank 1.

A grounding electrode 7 has a flowing water portion 7a whose surface is formed in planar form so that the treatment target water 6 flows evenly making a water film 10. The flowing water portion 7a is inclined by a stand 9 so as to become lower with respect to a horizontal plane in a depth direction (a Y direction in FIG. 1) of the grounding electrode 7, and is fixed inside the treatment tank 1 so as to be horizontal in a width direction (an X direction in FIG. 1) of the grounding electrode 7. Side walls 8a and 8b that restrict leaking of the treatment target water 6 from either side of the flowing water portion 7a are provided one each on edge portions in the width direction of the grounding electrode 7.

The treatment tank 1 includes, for example, a water seal structure in the water supply port 4 and the water discharge port 5 so that a gas cannot flow freely to and from the exterior. Also, the treatment tank 1 includes a splash prevention structure so that water does not splash around when the treatment target water 6 is caused to flow down from the water supply port 4 onto the flowing water portion 7a of the grounding electrode 7. As these structures can both be selected as appropriate from commonly known technology, the structures are omitted from the drawings.

A multiple (four in FIG. 1) of each of first insulating holding bodies 12 and second insulating holding bodies 13 are provided on the side walls 8a and 8b, both at predetermined intervals in the Y direction and so as to extend upward in a Z direction from the side walls 8a and 8b. A wire form high voltage electrode 11 is suspended between a leading end portion of the first insulating holding body 12 and a leading end portion of the second insulating holding body 13.

Each of the multiple (four in FIG. 1) of high voltage electrodes 11 is provided so as to extend in a direction parallel to the flowing water portion 7a and intersecting a direction of flow of the treatment target water 6, that is, in the width direction of the grounding electrode 7, in a position distanced upward in the Z direction from the flowing water portion 7a of the grounding electrode 7. Also, the multiple of high voltage electrodes 11 are provided parallel to each other across predetermined intervals. In the following description, a direction (the X direction in FIG. 1) the same as the width direction of the grounding electrode 7 is called an extension direction of the high voltage electrode 11. Also, each of the multiple of high voltage electrodes 11 is electrically connected in parallel to an output of a pulse power supply (omitted from the drawings), and the grounding electrode 7 is electrically grounded.

The blowing device 14, which is blowing means, is provided in a vicinity of an end portion on the water discharge port 5 side (the right side in FIG. 1) in the treatment tank 1. A multiple (three in FIG. 1) of blowing fans 15 are disposed in parallel in the X direction in the blowing device 14. Also, in FIG. 1, the water supply port 4 is provided in the upper face of the treatment tank 1 opposing a left side end portion of the grounding electrode 7, and the water discharge port 5 is provided in the bottom face of the treatment tank 1 opposing a right side end portion of the grounding electrode 7.

Oxygen gas ($O_2$), from which at least one of ozone ($O_3$), hydrogen peroxide ($H_2O_2$), or a hydroxyl radical (OH), which is more highly active than ozone, can be generated by an electrical discharge generated between the grounding electrode 7 and the high voltage electrode 11 is used as a kind of gas supplied from the gas supply port 2. However, the kind of gas supplied to the interior of the treatment tank 1 not being limited to oxygen gas, it is sufficient that the gas includes oxygen. For example, nitrogen or a noble gas can be mixed with oxygen at an arbitrary ratio. In particular, an electrical discharge can be stably formed even at a comparatively low voltage by using a noble gas, and a gas cost can be considerably reduced when using air.

In the first embodiment, a case wherein a pulse power supply is used for electrical discharge formation will be described, but a power supply is not necessarily limited to a pulse power supply provided that an electrical discharge can be stably formed. For example, the power supply may be an alternating current power supply or a direct current power supply. Also, a polarity of voltage output from the pulse power supply, a voltage crest value, a repetition frequency, a pulse width, and the like, can be determined as appropriate in accordance with conditions such as an electrode structure and a gas type. Generally, the voltage crest value is desirably within a range of 1 kV to 50 kV. This is because a stable electrical discharge is not formed when the voltage crest value is less than 1 kV, and when the voltage crest value exceeds 50 kV, there is an accompanying considerable increase in cost due to an increase in size of the power supply and more difficult electrical insulation.

Furthermore, the repetition frequency of the pulse power supply is desirably 10 pps (pulses per second) or more, 100 kpps or less. This is because an extremely high voltage is needed in order to provide sufficient discharge power when the repetition frequency is less than 10 pps, and when the repetition frequency is greater than 100 kpps, water treatment efficiency decreases. Also, the voltage, the pulse width, and the pulse repetition frequency may be adjusted in accordance with one or both of a flow of the treatment target water 6 and water quality of a treatment target substance.

Also, a metal material with excellent anti-corrosive properties, such as stainless steel or titanium, is desirably used for the grounding electrode 7 and the high voltage electrode 11. However, another conductive material can also be used. Furthermore, a surface of the grounding electrode 7 or the high voltage electrode 11 may be covered with a dielectric such as glass or a ceramic. Also, the high voltage electrode 11, which is a discharge electrode, need not necessarily be of a wire form. For example, a rod, screw, foil, or the like may be used.

Also, the number of the wire form high voltage electrode 11 disposed can be increased or reduced as appropriate in accordance with the quality or amount treated of the treatment target water 6, a device size, and the like. Furthermore, a distance between the high voltage electrode 11 and the grounding electrode 7 can be arbitrarily decided. However, a height of the high voltage electrode 11 with respect to the grounding electrode 7 is preferably 1 mm or more, 50 mm or less. Specifying an accurate height is difficult when the height of the high voltage electrode 11 with respect to the grounding electrode 7 is less than 1 mm, and when the height is greater than 50 mm, an extremely high voltage is needed for electrical discharge formation.

Furthermore, pressure of a gas inside the treatment tank 1 is desirably atmospheric pressure, or in a vicinity thereof, to facilitate supply and discharge of the treatment target water 6. However, the pressure can also be a positive pressure or a negative pressure when necessary. When the pressure inside the treatment tank 1 is a positive pressure, mixing with air from the exterior is restricted, and an atmosphere inside the treatment tank 1 is easily managed. Also, when the pressure inside the treatment tank 1 is a negative pressure, an electrical discharge 18 is formed at a comparatively low voltage, and the power supply can be reduced in size and simplified. Furthermore, the lower the pressure, the more easily the electrical discharge 18 spreads, because of which the electrical discharge 18 and the treatment target water 6 come into contact over a wide region, and water treatment speed increases.

Next, using FIG. 1, a water treatment method of the water treatment device according to the first embodiment will be described. Oxygen gas is supplied from a gas supply source (omitted from the drawing) to the inside of the treatment tank 1 through the gas supply port 2. Also, an amount of gas inside the treatment tank 1 the same as that of the oxygen gas supplied is discharged from the gas discharge port 3. Because of this, a high oxygen density atmosphere is formed inside the treatment tank 1 after a certain time elapses.

The treatment target water 6 is supplied to the inside of the treatment tank 1 from the water supply port 4, and drops to a vicinity of the left side end portion of the grounding electrode 7. Subsequently, the treatment target water 6 flows between the side walls 8a and 8b in accordance with the inclination of the flowing water portion 7a, while forming the water film 10 on the flowing water portion 7a of the grounding electrode 7. At this time, a thickness of the water film 10 is regulated so that the treatment target water 6 does not come in contact with the high voltage electrode 11. That is, the grounding electrode 7 and the high voltage electrode 11 oppose each other across the water film 10 and a gas layer, and the gas layer forms an electrical discharge region.

The treatment target water 6 drops downward from the right side end portion of the grounding electrode 7, and is discharged to the exterior of the treatment tank 1 through the water discharge port 5. One portion of the treatment target water 6 evaporates as water vapor during the process of the treatment target water 6 flowing inside the treatment tank 1, because of which a high oxygen density atmosphere including water vapor is formed in the interior of the treatment tank 1. At this time, the pulse power supply is driven, and a pulse form high voltage is applied to the high voltage electrode 11, whereby the electrical discharge 18 is generated from the high voltage electrode 11 toward the water film 10 on the water flowing portion 7a.

Furthermore, the blowing device 14 is activated, thereby driving the three blowing fans 15. The blowing fan 15 moves the gas inside the treatment tank 1, inducing the gas flow A oriented in the left direction in FIG. 1. The gas flow A flows through the electrical discharge region along the flowing water portion 7a in a direction opposite to the flow direction of the treatment target water 6, while coming into contact with the high voltage electrode 11 over the whole region in the extension direction of the high voltage electrode 11. That is, the direction of the gas flow A is a direction that intersects both the direction in which the electrical discharge 18 propagates (the Z direction) and the extension direction of the high voltage electrode 11 (the X direction).

By the gas flow A being formed by the blowing device A in this way when the electrical discharge 18 is generated, adhering of water droplets to the high voltage electrode 11 can be restricted, and even when water droplets do adhere to the high voltage electrode 11, the water droplets are blown away by a pressure of the gas flow A, and a spark discharge is restricted. Because of this, the electrical discharge 18 is formed uniformly along the high voltage electrode 11, the electrical discharge 18 comes into contact with the treatment target water 6 over a wide area, and organic matter in the treatment target water 6 is degraded and removed.

A velocity of the gas flow A can be determined as appropriate in accordance with water treatment conditions. In order to blow away water droplets adhering to the high voltage electrode 11 using the gas flow pressure, the gas flow velocity is desirably from several meters per second to several tens of meters per second. Also, an amount of gas blown by the blowing device 14, not needing to be constant, may be changed in accordance with treatment conditions and a composition of the treatment target water 6, or with a condition of adherence of water droplets to the high voltage electrode 11, or the like. This is described in detail in a ninth embodiment to be described hereafter.

Next, a water treatment principle of the water treatment method according to the first embodiment will be described. The treatment target water 6 comes into contact with the electrical discharge 18 when flowing along the flowing water portion 7a of the grounding electric 7, whereby organic matter including a persistent substance in the treatment target water 6 is degraded. Herein, a description is given with organic matter degradation as an example, but it is a commonly known fact that ozone or a hydroxyl radical generated by an electrical discharge is also effective in disinfecting, decoloration, and deodorization.

Owing to the electrical discharge 18, oxygen molecules (O$_2$) and water molecules (H$_2$O) inside the treatment tank 1 collide with high energy electrons, and dissociation reactions of formula (1) and formula (2) occur. In the following formulas, e is an electron, O is atomic oxygen, H is atomic hydrogen, and OH is a hydroxyl radical.

[Chem. 1]
Chem. 1

$$e + O_2 \rightarrow 2O \qquad (1)$$

[Chem. 2]
Chem. 2

$$e + H_2O \rightarrow H + OH \qquad (2)$$

A large amount of the atomic oxygen generated in formula (1) becomes ozone owing to a reaction of formula (3) below. In formula (3), M is a third body of a reaction, and represents any molecule or atom in the gas. Also, one portion of the hydroxyl radicals generated in formula (2) becomes hydrogen peroxide owing to a reaction of formula (4) below.

[Chem. 3]
Chem. 3

$$O + O_2 + M \rightarrow O_3 + M \qquad (3)$$

[Chem. 4]
Chem. 4

$$OH + OH \rightarrow H_2O_2 \qquad (4)$$

The oxide particles (O, OH, O$_3$, H$_2$O$_2$) generated by the reactions of formula (1) to formula (4) oxidize and degrade organic matter in a vicinity of a surface of the treatment target water 6 flowing on the flowing water portion 7a of the grounding electrode 7 into carbon dioxide ($CO_2$) and water according to formula (5) below. In formula (5), R is organic matter that is a treatment target.
[Chem. 5]
Chem. 5

$$R+(O,OH,O_3,H_2O_2) \rightarrow CO_2+H_2O \quad (5)$$

Atomic, oxygen and hydroxyl radicals that do not react with organic matter in formula (5) become ozone and hydrogen peroxide of a comparatively long lifetime according to formula (3) and formula (4), and one portion thereof dissolves in the treatment target water 6 according to formula (6) and formula (7) below. In each formula, (liq.) means a liquid phase.
[Chem. 6]
Chem. 6

$$O_3 \rightarrow O_3 \text{ (liq.)} \quad (6)$$

[Chem. 7]
Chem. 7

$$H_2O_2 \rightarrow H_2O_2 \text{ (liq.)} \quad (7)$$

Liquid phase ozone and hydrogen peroxide obtained in formula (6) and formula (7) generate hydroxyl radicals owing to an aqueous reaction of formula (8) below. Furthermore, liquid phase ozone, hydrogen peroxide, and hydroxyl radicals generated from formula (6) to formula (8) degrade organic matter owing to an aqueous reaction shown in formula (9) below.
[Chem. 8]
Chem. 8

$$O_3 \text{ (liq.)} + H_2O_2 \text{ (liq.)} \rightarrow \text{(intermediate)} \rightarrow OH \text{ (liq.)} \quad (8)$$

[Chem. 9]
Chem. 9

$$R+(O_3 \text{ (liq.)}. H_2O_2 \text{ (liq.)}. OH \text{ (liq.)}) \rightarrow CO_2+H_2O \quad (9)$$

In the first embodiment, organic matter in the treatment target water 6 is degraded by the reactions of both formula (5) and formula (9) in a region in which the treatment target water 6 is in direct contact with the electrical discharge 18. Meanwhile, organic matter in the treatment target water 6 is degraded by the reaction of formula (9) in a region in which the treatment target water 6 is not in direct contact with the electrical discharge 18.

A reason that fast and efficient water treatment can be carried out in the water treatment device according to the first embodiment will be described using FIG. 2A and FIG. 2B. FIG. 2A shows a case in which no water droplets are adhering to the high voltage electrode, and FIG. 2B shows a case in which water droplets are adhering to the high voltage electrode. Generally, a water treatment device wherein an electrical discharge is caused to come into direct contact with treatment target water is such that water droplets may adhere to an electrode due to splashing of the treatment target water or condensation. The water treatment device according to the first embodiment is such that the treatment target water 6 exists as the water film 10 on an upper surface of the grounding electrode 7, and the high voltage electrode 11 is provided above the water film 10 across a gas layer that forms an electrical discharge region.

When no water droplets are adhering to the high voltage electrode 11, as shown in FIG. 2A, the distance between the high voltage electrode 11 and the water film 10 is practically uniform over the whole of the extension direction of the high voltage electrode 11, and a uniform electrical field is formed between the high voltage electrode 11 and the water film 10. Because of this, the uniform electrical discharge 18 is formed in a so-called sheet form at each high voltage electrode 11, over the whole region in the extension direction of the high voltage electrode 11, between the high voltage electrode 11 and the water film 10. The electrical discharge 18 at this time is generally a streamer form electrical discharge, and although an electron temperature reaches several tens of thousands of degrees (° C.), a temperature of a neutral gas particle remains at room temperature.

Meanwhile, when a water droplet 40 is adhering to the high voltage electrode 11, as shown in FIG. 2B, the water droplet 40 sags down in the direction of the water film 10 due to gravity, and a distance between a leading end portion of the water droplet 40 and the grounding electrode 7 becomes shorter. When voltage is applied to the high voltage electrode 11 in this state, an electric field intensity of the leading end portion of the water droplet 40 increases locally, and a locally strong electrical discharge, that is, a spark discharge 41, is generated at the leading end of the water droplet 40. The spark discharge 41 is such that a neutral gas particle temperature reaches one thousand degrees or higher. Once the spark discharge 41 is generated, a gas temperature in a vicinity thereof rises, because of which a still stronger electrical discharge is liable to be generated, and the spark discharge 41 is generated continuously. As a result of this, the electrical discharge is no longer generated in a region other than the leading end portion of the water droplet 40, or the electrical discharge becomes non-uniform, because of which the electrical discharge becomes localized.

For water treatment, the streamer form electrical discharge 18 of FIG. 2A is preferable, while the spark discharge 41 of FIG. 2B is an undesirable electrical discharge aspect. As previously described, water treatment proceeds according to formula (5) and formula (9). In order to cause formula (5) to occur efficiently, widening the area of contact between the electrical discharge and the treatment target water 6 is important. As the streamer form electrical discharge 18 is formed uniformly over the whole of the high voltage electrode 11, the electrical discharge 18 is in contact with the water film 10 over a wide area, but the spark discharge 41 is localized, because of which the area of contact with the water film 10 decreases.

Also, in order to cause formula (9) to occur, ozone and hydrogen peroxide need to be dissolved in the treatment target water 6 according to formula (6) and formula (7). When the spark discharge 41 is generated, however, the gas temperature rises to one thousand degrees or higher, and gas phase ozone and hydrogen peroxide are thermally degenerated. Because of this, ozone and hydrogen peroxide dissolved in the treatment target water 6 decrease, and the reaction of formula (9) is unlikely to occur. For these two reasons, that is, because the area of contact between the electrical discharge and the treatment target water decreases and because ozone and hydrogen peroxide are thermally degenerated, the spark discharge 41 is undesirable when carrying out water treatment, and forming the streamer form electrical discharge 18 uniformly is important.

Next, advantages of an gas flow in water treatment will be described. In addition to removing the water droplet 40 adhering to the high voltage electrode 11, the gas flow A induced by the blowing device 14 also has advantages of increasing the speed and the efficiency of the water treatment. Generally, high power needs to be supplied to an electrical discharge in order to carry out fast water treatment, and one portion of ozone or hydrogen peroxide formed by a first pulse discharge is degraded by an electron collision or heating due to a subsequently generated pulse discharge, whereby one portion of the ozone or hydrogen peroxide is eliminated and becomes ineffective. That is, when increasing discharge power in order to increase water treatment speed, there is an increase in oxide particles being eliminated and becoming ineffective, and there is a contradiction in that water treatment efficiency decreases.

In response to this, the blowing device 14 forms the gas flow A that intersects each of the direction in which the electrical discharge 18 propagates and the extension direction of the high voltage electrode 11, because of which ozone or hydrogen peroxide generated by a first pulse discharge is conveyed outside the electrical discharge region by the gas flow A before the next pulse discharge is generated, whereby ozone or hydrogen peroxide being eliminated and becoming ineffective is restricted. As a result of this, water treatment speed and efficiency increase in comparison with a case in which there is no gas flow A.

Also, a large amount of the ozone and hydrogen peroxide dissolved in the treatment target water 6 by the reactions of formula (6) and formula (7) generally diffuses slowly in the water, because of which there is a problem in that the ozone and hydrogen peroxide remain in a vicinity of the surface of the water film 10, and water treatment in a deep portion of the water film 10 does not progress. In response to this, the first embodiment is such that the gas flow A flows along an upper surface of the water film 10 in a direction opposite to the flow direction of the treatment target water 6, because of which the surface of the water film 10 becomes wavy owing to the gas flow pressure. Because of this, the treatment target water 6 on the flowing water portion 7a is agitated, and the dissolved ozone and hydrogen peroxide existing biased toward a surface layer vicinity diffuse to the deep portion of the water film 10, because of which water treatment speed and efficiency increase in comparison with a case in which the blowing device 14 is not used.

Next, a reason that breakage of the high voltage electrode 11 is restricted in the water treatment device according to the first embodiment will be described. Once the spark discharge 41 is formed with the water droplet 40 as an origin, the spark discharge 41 is still more liable to be generated due to heating or an increase in electron density in a vicinity of the spark discharge 41. When the spark discharge 41 continues and a large current flows into the high voltage electrode 11, the high voltage electrode 11 may melt and break due to heating. In response to this, the water treatment device according to the first embodiment is such that the gas flow A is induced by the blowing device 14, and generation of the water droplet 40 is restricted, because of which the spark discharge 41 is restricted, and breakage of the high voltage electrode 11 is also restricted.

Next, using FIG. 3, a modified example of the water treatment device according to the first embodiment will be described. The modified example is such that, a multiple (four in FIG. 3) of treatment tanks 1A, 1B, 1C, and 1D (collectively referred to as treatment tanks 1) are stacked in a vertical direction, and the treatment target water 6 flows down with the multiple of treatment tanks 1 in parallel. The water supply port 4 is provided on an upstream side of each treatment tank 1. Water supply pipes 50A, 50B, 50C, and 50D (collectively referred to as water supply pipes 50) that supply the treatment target water 6 are connected one to each water supply port 4, and valves 51A, 51B, 51C, and 51D (collectively referred to as valves 51) that can regulate the flow of the treatment target water 6 are provided one in each water supply pipe 50.

Also, blowing devices 14A, 14B, 14C, and 14D (collectively referred to as blowing devices 14) are provided one inside each treatment tank 1, and the blowing devices 14 induce the gas flow A that flows along an upper face of grounding electrodes 7A, 7B, 7C, and 7D (collectively referred to as grounding electrodes 7) in a direction opposite to the flow direction of the treatment target water 6, while coming into contact with high voltage electrodes 11 over the whole region in an extension direction of high voltage electrodes 11A, 11B, 11C, and 11D (collectively referred to as high voltage electrodes 11).

In the modified example, an amount of the treatment target water 6 that can be treated per hour in each treatment tank 1 is taken to be Q. Firstly, when an amount of the treatment target water 6 equivalent to 4Q is supplied, each valve 51 is fully opened, causing the treatment target water 6 to flow into each treatment tank 1. Furthermore, a pulse power supply is activated, and a pulse voltage is applied to the high voltage electrode 11. Because of this, an electrical discharge is formed from each high voltage electrode 11 toward the treatment target water 6 on the upper face of the grounding electrode 7, organic matter including a persistent substance is degraded and removed by the treatment target water 6 coming into contact with the electrical discharge, and the amount of water equivalent to 4Q is treated.

Also, when an amount of the treatment target water 6 equivalent to 2Q is supplied, the valves 51A and 51B are fully opened, causing the treatment target water 6 to flow into the treatment tanks 1A and 1B, in addition to which the valves 51C and 51D are fully closed, allowing no treatment target water 6 to flow into the treatment tanks 1C and 1D. Alternatively, when the treatment target water 6 includes a persistent substance to a high density, all the valves 51 may be half-opened, and an amount of the treatment target water 6 equivalent to 0.5Q caused to flow into each treatment tank 1.

In this modified example, a configuration is such that a multiple of treatment tanks 1 are stacked, but the grounding electrodes 7A, 7B, 7C, and 7D, the high voltage electrodes 11A, 11B, 11C, and 11D, and the blowing devices 14A, 14B, 14C, and 14D can be provided in an interior of one treatment tank 1. That is, a multiple of units including the grounding electrode 7 and the high voltage electrode 11 may be housed in a vertical direction inside one treatment tank 1, and blowing means corresponding to each unit provided. In this case, at least a multiple of water supply ports 4 corresponding to each unit are provided in the treatment tank 1.

As heretofore described, the water treatment device according to the first embodiment includes the blowing device 14 that induces an gas flow in the interior of the treatment tank 1, and by forming the gas flow A that flows along the flowing water portion 7a of the grounding electrode 7 in a direction opposite to the flow direction of the treatment target water 6, while coming into contact with the high voltage electrode 11 over the whole region in the extension direction of the high voltage electrode 11, adhering of the water droplet 40 to the high voltage electrode 11 can be restricted, and even when the water droplet 40 does adhere to the high voltage electrode 11, the water droplet 40 can be blown away by the pressure of the gas flow A, because of which the spark discharge 41 is restricted. Because of this, the uniform streamer form electrical discharge 18 is stably maintained over the whole region in the extension direction of the high voltage electrode 11, the electrical discharge 18 can be brought into contact over a wide area of the treatment target water 6, and fast water treatment can be carried cut.

Also, by the spark discharge 41 being restricted, a thermal degradation reaction of gas state ozone and hydrogen peroxide is restricted, because of which fast and efficient water treatment is carried out, and breakage of the high voltage electrode 11 is restricted. Furthermore, by the flow direction of the treatment target water 6 and the direction of the gas flow A being opposite directions, substance transportation to a liquid phase from a gas phase including ozone or hydrogen peroxide generated by the electrical discharge 18 is promoted, and fast and efficient water treatment is realized.

Also, by the flowing water portion 7a of the grounding electrode 7 being inclined, the area of contact between the treatment target water 6 and the electrical discharge 18 can be increased with respect to a case in which the grounding electrode 7 is not inclined inside the same treatment tank 1, whereby water treatment speed and efficiency increase. Also, the blowing fan 15 is provided inside the treatment tank 1, and the gas inside the treatment tank 1 is moved to form the gas flow A, because of which there is no need to install piping for forming a gas passage on the exterior of the treatment tank 1, and the configuration is simple.

Furthermore, according to the modified example of the first embodiment, the treatment tank 1 that operates can be switched in accordance with a quality or an amount of the treatment target water 6, because of which water treatment can be carried out with an optimum amount of power, regardless of the quality or the amount of the treatment target water 6. Also, by a multiple of treatment tanks 1 being stacked in a vertical direction, the amount of the treatment target water 6 can be increased without increasing an installation area of the treatment tank 1.

Second Embodiment

Figure 4:
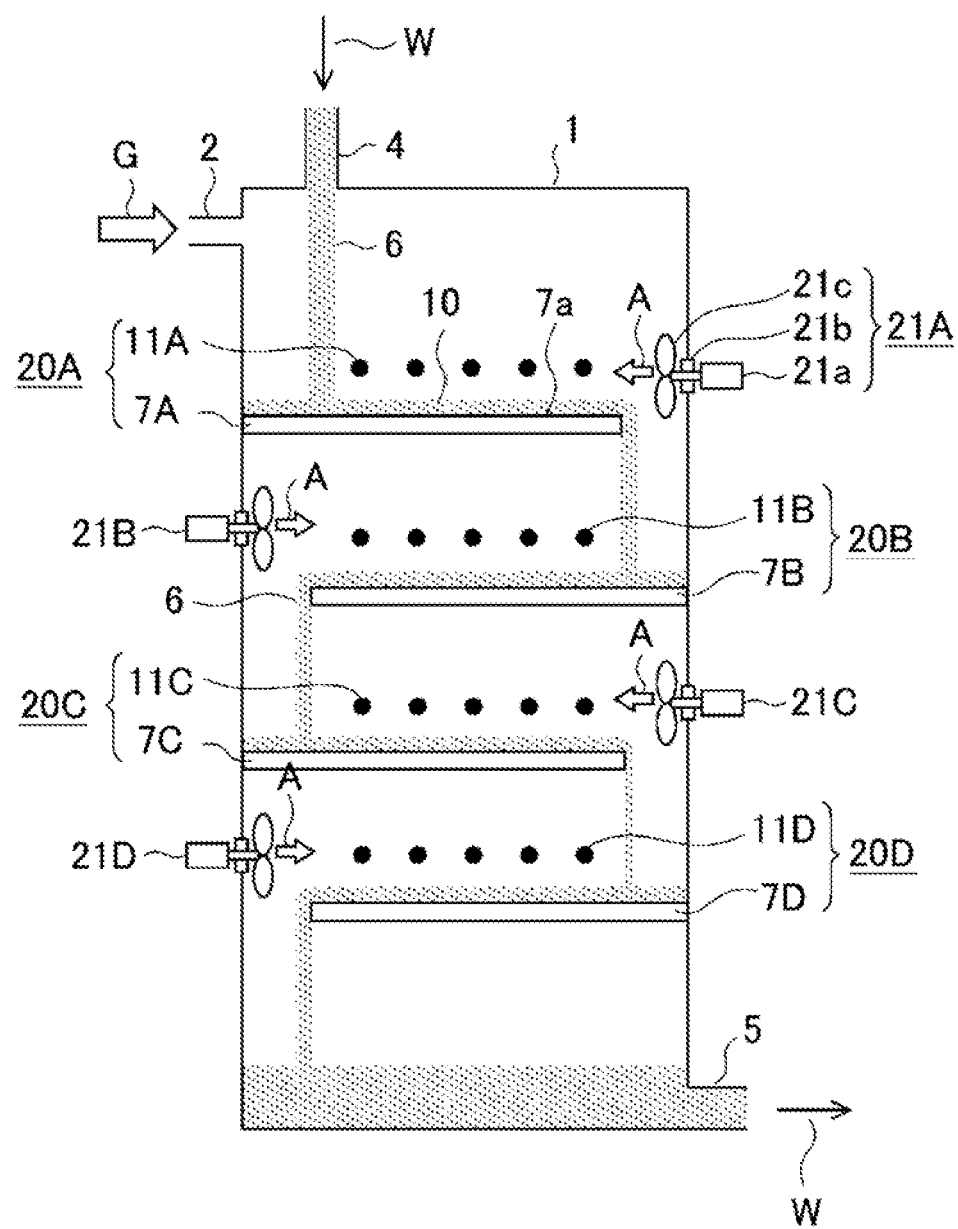
FIG. 4 is a sectional view showing a main configuration of a water treatment device according to a second embodiment of the invention.

FIG. 4 is a sectional view schematically showing a main configuration of a water treatment device according to a second embodiment of the invention. The water treatment device according to the second embodiment is such that a multiple (four in FIG. 4) of units 20A, 20B, 20C, and 20D (collectively referred to as units 20) are housed at predetermined intervals in a vertical direction in the interior of the metal treatment tank 1.

Each unit 20 is configured of a grounding electrode and high voltage electrodes. The unit 20A on an uppermost level has the grounding electrode 7A, which is of a metal plate form, and a multiple (five in FIG. 4) of high voltage electrodes 11A, which are of wire form. The flowing water portion 7a of the grounding electrode 7A is formed in a flat form so that the treatment target water 6 flows while making the water film 10, and the flowing water portion 7a is installed horizontally. The high voltage electrode 11A is supported with respect to the grounding electrode 7A and the treatment tank 1 via an insulating material (omitted from the drawing). The high voltage electrode 11A is connected to a pulse power supply, and the treatment tank 1 is electrically grounded.

Each of the multiple of high voltage electrodes 11A is provided parallel to the flowing water portion 7a, and so as to extend in a direction that intersects the flow direction of the treatment target water 6, in a position distanced from the flowing water portion 7a of the grounding electrode 7A. Also, the multiple of high voltage electrodes 11A are provided parallel to each other across predetermined intervals. As configurations of the other units 20B, 20C, and 20D are the same as that of the unit 20A, a description will be omitted. The number of the unit 20, the number of the high voltage electrode 11 in each unit 20, and the like, can be set as appropriate in accordance with dimensions of the treatment tank 1, a necessary water treatment capacity, and the like.

The treatment tank 1 is such that the water supply port 4 is provided in the upper face, and the water discharge port 5 is provided in a lowermost portion of a side face. Also, the gas supply port 2 is provided in an upper portion of a side face of the treatment tank 1. The units 20 are disposed so that the flow direction of the treatment target water 6 in the unit 20 disposed on an upper level side and the flow direction of the treatment target water 6 in the unit 20 disposed on a lower level side neighboring the unit 20 on the upper level side are opposite directions. That is, the flow directions of the treatment target water 6 in units 20 neighboring in the vertical direction are opposite directions.

As shown in FIG. 4, the unit 20A and the unit 20C are such that a left side end portion of each of the grounding electrodes 7A and 7C is fixed to a left side face of the treatment tank 1, and right side end portions of the grounding electrodes 7A and 7C are distanced by a predetermined dimension from a right side face of the treatment tank 1. The treatment target water 6 that passes over the flowing water portion 7a of the grounding electrodes 7A and 7C drops from a portion where the grounding electrodes 7A and 7C and the right side face are distanced, and gas in the interior of the treatment tank 1 also flows through the same portion.

Meanwhile, the unit 20B and the unit 20D are such that a right side end portion of each of the grounding electrodes 7B and 7D is fixed to the right side face of the treatment tank 1, and left side end portions of the grounding electrodes 7B and 7D are distanced by a predetermined dimension from the left side face of the treatment tank 1. The treatment target water 6 that passes over the flowing water portion 7a of the grounding electrodes 7B and 7D drops from a portion where the grounding electrodes 7B and 7D and the left side face are distanced, and gas in the interior of the treatment tank 1 also flows through the same portion. Because of this, the treatment target water 6 supplied from the water supply port 4 drops in a zigzag form along the flowing water portion 7a of each of the grounding electrodes 7A, 7B, 7C, and 7D (collectively referred to as grounding electrodes 7) of the units 20, as shown in FIG. 4.

Also, as shown in FIG. 4, propeller units 21A, 21B, 21C, and 21D (collectively referred to as propeller units 21), which are blowing means, are provided corresponding to each unit 20. Each propeller unit 21 includes a bearing 21b provided so as to penetrate the treatment tank 1, a motor 21a provided on the exterior of the treatment tank 1 across the bearing 21b, and a fin 21c rotated by the motor 21a. The fin 21c is disposed at practically the same height as a vertical direction installation position of the high voltage electrode 11 on the side face of the treatment tank 1 on the side from which the grounding electrode 7 is distanced.

Each propeller unit 21 is attached facing the opposing high voltage electrode 11 so as to induce the gas flow A in a direction opposite to the flow direction of the treatment target water 6. Also, each propeller unit 21 includes a multiple of fins 21c so as to be able to cause the gas flow A to act over the whole region in the extension direction of each high voltage electrode 11A, 11B, 11C, and 11D (collectively referred to as high voltage electrodes 11). Other configurations are the same as in the first embodiment.

An operation of the water treatment device according to the second embodiment will be described. A predetermined amount of oxygen gas is supplied from a gas supply source to the inside of the treatment tank 1 through the gas supply port 2. As the treatment tank 1 does not include a gas discharge port in the second embodiment, an amount of gas inside the treatment tank 1 equivalent to the amount of oxygen gas supplied is discharged together with the treatment target water 6 from the water discharge port 5. Because of this, air inside the treatment tank 1 is gradually discharged to the outside, and a high oxygen density atmosphere is formed inside the treatment tank 1 after a predetermined time elapses.

The treatment target water 6 is supplied to the inside of the treatment tank 1 from the water supply port 4, flows along the flowing water portion 7a of the grounding electrode 7A while forming the water film 10, and drops from the right side end portion of the grounding electrode 7A to an upper face of the grounding electrode 7B. Subsequently, in the same way, the treatment target water 6 flows along the flowing water portion 7a of the grounding electrode 7B, the grounding electrode 7C, and the grounding electrode 7D sequentially, eventually drops to a bottom portion of the treatment tank 1, and is discharged from the water discharge port 5. During this process, one portion of the treatment target water 6 evaporates as water vapor, because of which a high oxygen density atmosphere including water vapor is formed in the interior of the treatment tank 1. Also, the thickness of the water film 10 is regulated so that a gas layer is formed between the high voltage electrode 11 and the water film 10. The thickness of the water film 10 is regulated in accordance with the amount of the treatment target water 6 supplied or a surface roughness of the upper face of the grounding electrode 7.

Next, the propeller units 21 are activated, thereby inducing the gas flow A inside the treatment tank 1. Each propeller unit 21 moves the gas inside the treatment tank 1, thereby forming the gas flow A that intersects both the extension direction of the high voltage electrode 11 and the direction in which an electrical discharge propagates, and flows in a direction opposite to the flow direction of the treatment target water 6. Furthermore, the pulse power supply is activated, and a pulse voltage is applied to each high voltage electrode 11. Because of this, an electrical discharge is formed from the high voltage electrode 11 toward the treatment target water 6 on the flowing water portion 7a in each unit 20, and organic matter including a persistent substance is degraded and removed by the treatment target water 6 coming into contact with the electrical discharge during the process of flowing over the flowing water portion 7a. A water treatment principle is the same as in the first embodiment.

According to the second embodiment, the gas flow A that intersects both the extension direction of the high voltage electrode 11 and the direction in which the electrical discharge propagates is induced by the propeller units 21 that act as blowing means being activated, because of which the same advantages as in the first embodiment are obtained. Also, four units 20 including the grounding electrode 7 and the high voltage electrode 11 are provided in the vertical direction, and an electrical discharge is formed between the grounding electrode 7 and the high voltage electrode 11 of each unit 20, whereby the area of contact in which the electrical discharge and the treatment target water 6 come into contact can be increased with respect to that in the first embodiment, even when the installation area is smaller than in the first embodiment, because of which fast and efficient water treatment can be carried out.

Third Embodiment

Figure 5:
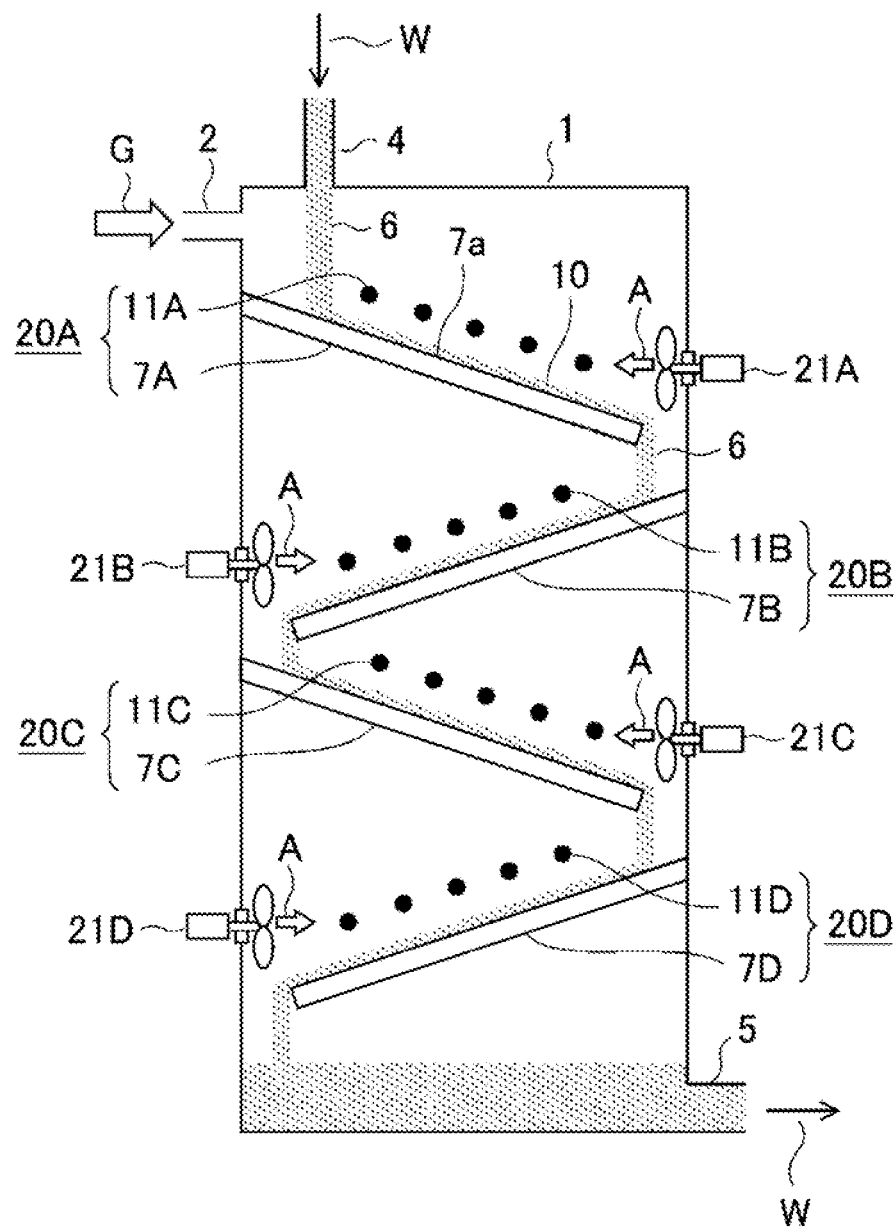
FIG. 5 is a sectional view showing a main configuration of a water treatment device according to a third embodiment of the invention.

FIG. 5 is a sectional view schematically showing a main configuration of a water treatment device according to a third embodiment, of the invention. The water treatment device according to the third embodiment is such that the flowing water portion 7a of the grounding electrode 7 of each unit 20 is inclined so as to become lower with respect to a horizontal plane toward a downstream side of the flow direction of the treatment target water 6. Also, grounding electrodes 7 neighboring in the vertical direction are inclined in opposite directions to each other, and the flow directions of the treatment target water are opposed. Each grounding electrode 7 is installed horizontally in the width direction. The treatment target water 6 flows sequentially down in a continuous flow of a zigzag form along the flowing water portion 7a of each inclined grounding electrode 7.

The left side end portion of the grounding electrode 7A is fixed to the left side face of the treatment tank 1, the right side end portion is distanced by a predetermined dimension from the right side face of the treatment tank 1, and the left side end portion is held in a position higher than the right side end portion. Also, the right side end portion of the grounding electrode 7B is fixed to the right side face of the treatment tank 1, the left side end portion is distanced from the left side face of the treatment tank 1, and the right side end portion is held in a position higher than the left side end portion. Thereafter, the grounding electrode 7C and the grounding electrode 7D are alternately provided in the same way. As other configurations, an operation, and a water treatment principle of the water treatment device according to the third embodiment are the same as in the first embodiment and the second embodiment, a description will be omitted.

A degree of inclination of the grounding electrode 7 of the water treatment device according to the third embodiment can be determined as appropriate. Generally, when the degree of inclination is increased, the thickness of the water film 10 decreases, while the downward flow velocity of the treatment target water 6 increases, and a time the treatment target water 6 stays inside the treatment tank 1 becomes shorter. Consequently, the degree of inclination is desirably determined as appropriate with consideration to a size of the treatment tank 1, the quality of the treatment target water 6, the amount of the treatment target water 6, and the like.

According to the third embodiment, in addition to the same advantages as in the second embodiment, the grounding electrode 7 of each unit 20 is inclined, because of which the thickness of the water film 10 decreases in comparison with a case in which the grounding electrode 7 is disposed horizontally. Because of this, a ratio of surface area with respect to volume of the treatment target water 6 increases, and the reactions of formula (5), formula (6), and formula (7) occur more frequently, because of which fast and efficient water treatment is carried out.

Fourth Embodiment

Figure 6:
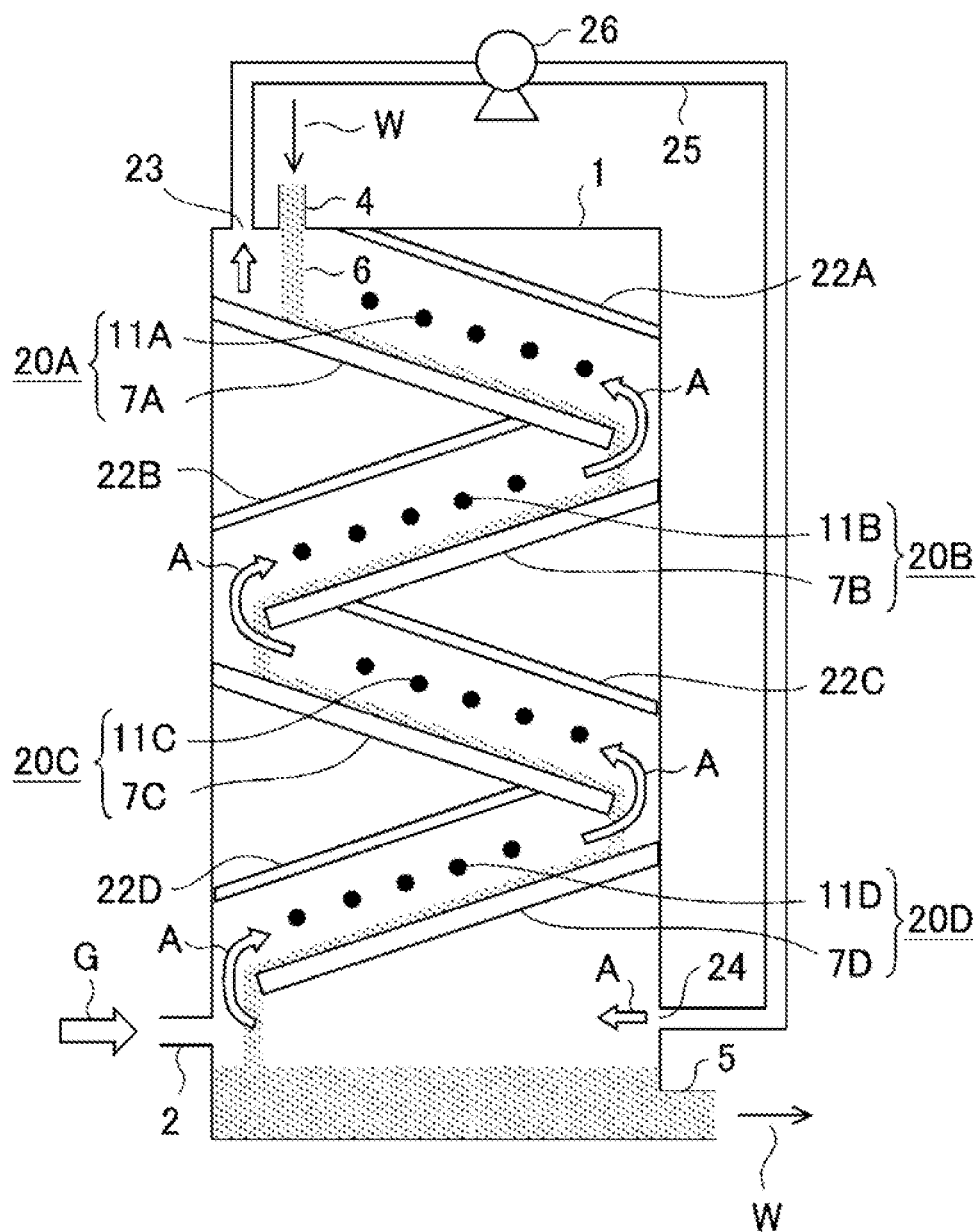
FIG. 6 is a sectional view showing a main configuration of a water treatment device according to a fourth embodiment of the invention.

FIG. 6 is a sectional view schematically showing a main configuration of a water treatment device according to a fourth embodiment of the invention. The water treatment device according to the fourth embodiment has a circulation pipe 25, which is a gas circulation passage, and a blower 26 as blowing means, and guides 22A, 22B, 22C, and 22D (collectively referred to as guides 22), which are gas guiding members that guide a gas flow, are provided above the high voltage electrode 11 of each unit 20. As other configurations, an operation, a water treatment principle, and the like of the water treatment device according to the fourth embodiment are the same as in the first embodiment or the third embodiment, a description will be omitted.

As shown in FIG. 6, the treatment tank 1 is such that a circulating gas exit 23 is provided in the upper face, and a circulating gas discharge port 24 is provided in a vicinity of a bottom portion of the right side face. The circulation pipe 25 is provided on the exterior of the treatment tank 1 so as to connect the circulating gas exit 23 and the discharge port 24, and the blower 26 is disposed partway along the circulation pipe 25. In the fourth embodiment, the discharge port 24 is provided in a side face of the treatment tank 1 opposing a downstream side end portion of the treatment target water 6 in the unit 20D on the lowermost level, and the circulating gas exit 23 is provided in the upper face of the treatment tank 1 opposing an upstream side end portion of the treatment target water 6 in the unit 20A on the uppermost level. Also, the gas supply port 2 is provided in a vicinity of a bottom portion of the left side face of the treatment tank 1.

The plate form guide 22A, which connects the right side face of the treatment tank 1 and the upper face of the treatment tank 1, is installed parallel with the grounding electrode 7 on a side of the high voltage electrode 11A of the unit 20A opposite to that of the grounding electrode 7A. In the same way, the guide 22B, which connects the left side face of the treatment tank 1 and the lower face of the grounding electrode 7A, is provided in the unit 20B, the guide 22C, which connects the right side face of the treatment tank 1 and the lower face of the grounding electrode 7B, is provided in the unit 20C, and the guide 22D, which connects the left side face of the treatment tank 1 and the lower face of the grounding electrode 7C, is provided in the unit 20D.

In the fourth embodiment, gas inside the treatment tank 1 taken in from the circulating gas exit 23 passes through the circulation pipe 25, and is discharged into a lower space of the treatment tank 1 from the discharge port 24, by the blower 26 being activated. Because of this, the gas flow A is formed inside the treatment tank 1. The gas flow A flows in a direction opposite to the flow direction of the treatment target water 6 along an upper face of the grounding electrode 7D in a region enclosed by the grounding electrode 7D, the guide 22D, and three side faces (the left side face in FIG. 6 and front and back direction side faces not shown in the drawing) of the treatment tank 1.

Subsequently, the gas flow A sequentially passes through a region enclosed by the grounding electrode 7C, the guide 22C, and side faces of the treatment tank 1, and a region enclosed by the grounding electrode 7B, the guide 22B, and side faces of the treatment tank 1, finally passes through a region enclosed by the grounding electrode 7A, the guide 22A, and side faces of the treatment tank 1, and is taken in from the circulating gas exit 23. In this way, in the fourth embodiment, gas inside the treatment tank 1 is circulated by the blower 26, and the gas flow A is induced as a continuous flow inside the treatment tank 1.

A material of the guide 22 is not particularly limited, but when a metal material such as, for example, stainless steel is used, a distance between the guide 22 and the high voltage electrode 11 is desirably greater than a distance between the grounding electrode 7 and the high voltage electrode 11. By so doing, an electrical discharge in an undesirable place can be restricted. Also, when an insulating body such as a ceramic or glass is used for the guide 22, the guide 22 can be disposed in proximity to the high voltage electrode 11. Consequently, the region through which the gas flow A passes can be narrowed, and an advantage is obtained in that a spark discharge is restricted with a small amount of blown gas.

Also, it not being essential that the blowing means is the blower 26, a pump, a fan, or the like can be used. However, as the equipment is used with respect to a high humidity gas including ozone inside the treatment tank 1, using equipment with excellent anti-corrosive properties is desirable. For example, a pump, a blower, or the like coated with polytetrafluoroethylene (PTFE) is preferably used.

According to the fourth embodiment, in addition to the same advantages as in the first embodiment and the third embodiment, the gas flow A induced by one blower 26 is caused to pass consecutively through four units 20, whereby the gas flow A is caused to act over the whole of an electrical discharge region including each high voltage electrode 11, because of which there is no need to provide the propeller unit 21 corresponding to the high voltage electrode 11 of each unit 20, as is the case in the third embodiment, and the device configuration is simplified. Also, turbulence is restricted by the guide 22 being provided, and the gas flow A is circulated without dissipating, because of which an advantage is obtained in that a spark discharge is restricted with a small amount of blown gas overall.

Fifth Embodiment

Figure 7:
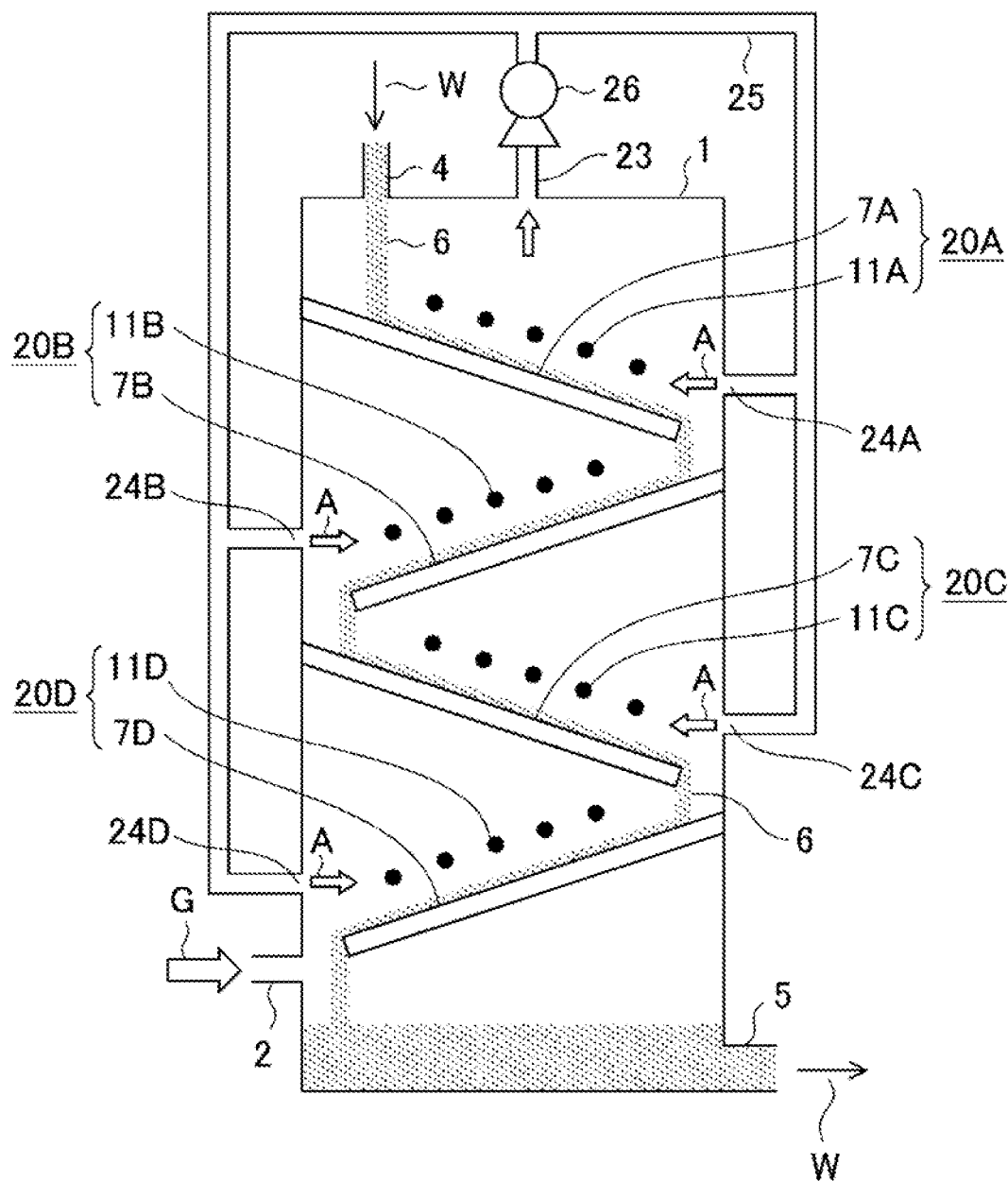
FIG. 7 is a sectional view showing a main configuration of a water treatment device according to a fifth embodiment of the invention.

FIG. 7 is a sectional view schematically showing a main configuration of a water treatment device according to a fifth embodiment of the invention. The water treatment device according to the fifth embodiment is such that circulation gas discharge ports 24A, 24B, 24C, and 24D (collectively referred to as discharge ports 24) are provided in a side face of the treatment tank 1 opposing a downstream side end portion of the treatment target water 6 in each unit 20, without providing the guide 22 of the water treatment device according to the fourth embodiment. As other configurations, an operation, a water treatment principle, and the like of the water treatment device according to the fifth embodiment are the same as in the first embodiment or the fourth embodiment, a description will be omitted.

As shown in FIG. 7, one end portion of the circulation pipe 25 is connected to the circulating gas exit 23 provided in the upper face of the treatment tank 1, and communicates with an intake portion of the blower 26. In the right side face of the treatment tank 1, the discharge port 24A, which penetrates the treatment tank 1, is provided in a position opposing the high voltage electrode 11A in a right side end portion of the unit 20A, and the discharge port 24C is provided in a position opposing the high voltage electrode 11C in a right side end portion of the unit 20C.

Also, in the left side face of the treatment tank 1, the discharge port 24B is provided in a position opposing the high voltage electrode 11B in a left side end portion of the unit 20B, and the discharge port 24D is provided in a position opposing the high voltage electrode 11D in a left side end portion of the unit 20D. Another end portion of the circulation pipe 25 branches into a multiple of pipes, and is connected to each of the discharge ports 24A, 24B, 24C, and 24D. Each discharge port 24 is formed in a long and thin slit form so that the gas flow A comes into contact uniformly over the whole region in the extension direction of the high voltage electrode 11.

The water treatment device according to the fifth embodiment is such that gas inside the treatment tank 1 taken in from the circulating gas exit 23 passes through the circulation pipe 25 that branches to correspond to the multiple (four in FIG. 7) of units 20, and is discharged from each discharge port 24, by the blower 26 being activated. Because of this, the gas flow A is formed to flow along the flowing water portion of the grounding electrode 7 in a direction opposite to the flow direction of the treatment target water 6, while coming into contact with the high voltage electrode 11 over the whole region in the extension direction of the high voltage electrode 11.

According to the fifth embodiment, in addition to the same advantages as in the first embodiment, the circulation pipe 25 has a number of branches equivalent to the number of units 20, and a spark discharge is restricted by the gas flow A being discharged from the discharge port 24 formed in the side face of the treatment tank 1 corresponding to the high voltage electrode 11 of each unit 20, because of which the guide 22 of the fourth embodiment (refer to FIG. 6) can be omitted, and the internal configuration of the treatment tank 1 can be simplified more than in the fourth embodiment.

Sixth Embodiment

Figure 8:
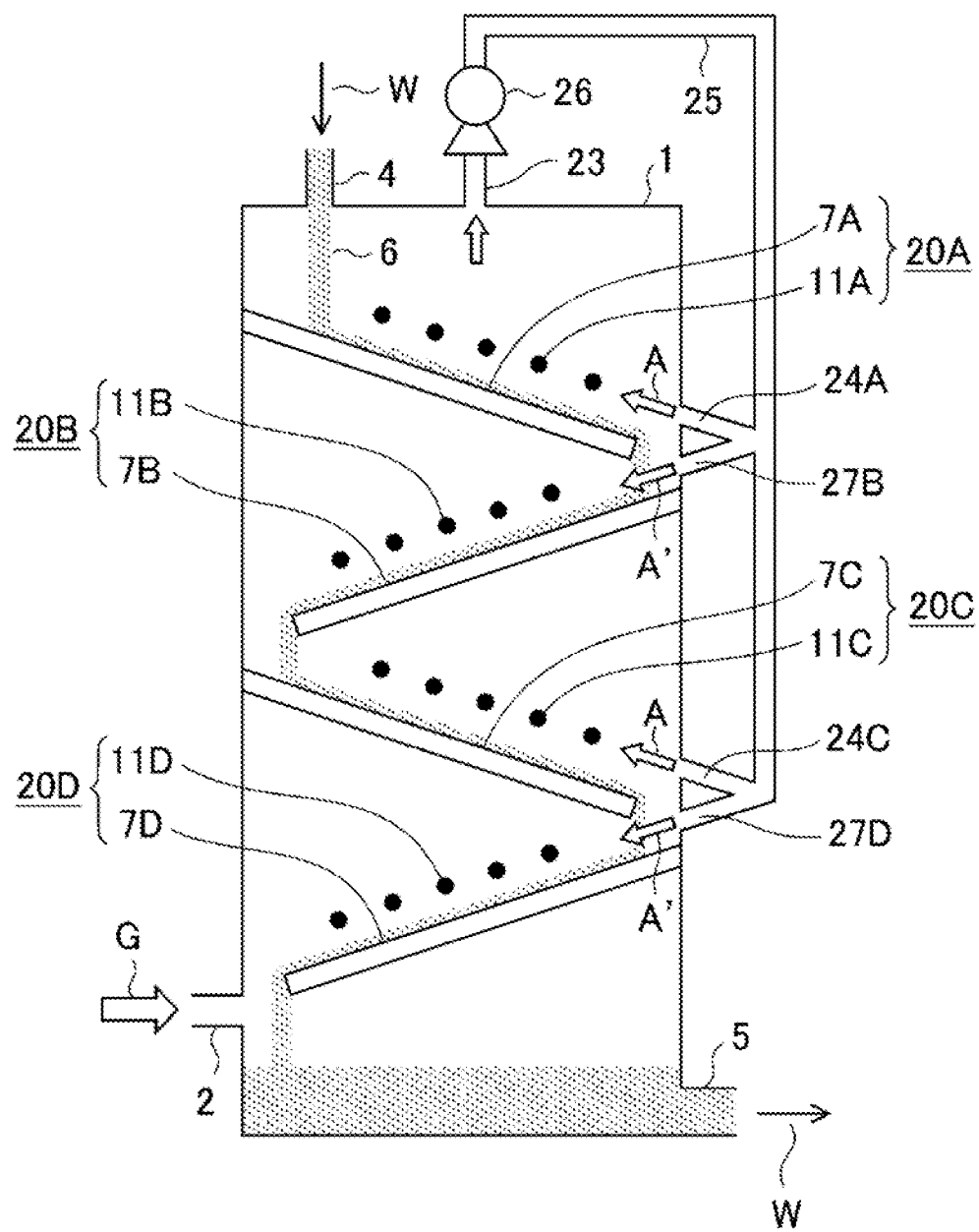
FIG. 8 is a sectional view showing a main configuration of a water treatment device according to a sixth embodiment of the invention.

FIG. 8 is a sectional view schematically showing a main configuration of a water treatment device according to a sixth embodiment of the invention. The water treatment device according to the sixth embodiment is such that the positions of the discharge ports 24 of the water treatment device according to the filth embodiment are partially changed, so that the discharge ports 24A and 24C and the oppositely oriented discharge ports 27B and 27D are all provided in the right side face of the treatment tank 1. The circulation pipe 25 branches into four systems, and is connected to each of the discharge ports 24A and 24C and the oppositely oriented discharge ports 27B and 27D. As other configurations, an operation, a water treatment principle, and the like of the water treatment device according to the sixth embodiment are the same as in the first embodiment or the fifth embodiment, a description will be omitted.

As shown in FIG. 8, the water treatment device according to the sixth embodiment is such that the discharge port 24A corresponding to the high voltage electrode 11A of the unit 20A and the discharge port 24C corresponding to the high voltage electrode 11C of the unit 20C are provided in a side face of the treatment tank 1 opposing a downstream side end portion of the treatment target water 6 in the units 20A and 20C, and form the gas flow A in a direction opposite to the flow direction of the treatment target water.

Also, the oppositely oriented discharge port 27B corresponding to the high voltage electrode 11B of the unit 20B and the oppositely oriented discharge port 27D corresponding to the high voltage electrode 11D of the unit 20D are provided in a side face of the treatment tank 1 opposing an upstream side end portion of the treatment target water 6 in the units 20B and 20D, and form an gas flow A' in a direction the same as the flow direction of the treatment target water 6.

In the sixth embodiment, two each of the discharge port 24 and the reversely oriented discharge port 27 are provided, but the number of the discharge port 24 and the reversely oriented discharge port 27 installed, and an installation ratio thereof, can be changed as appropriate with consideration to simplicity of device configuration, water treatment efficiency, and the like. In terms of an advantage of dissolving gas phase ozone and hydrogen peroxide in the treatment target water 6 inside the treatment tank 1, the gas flow A, which is an opposing flow, is desirable, but in terms of an advantage of water droplets adhering to the high voltage electrode 11 being blown away by the gas flow pressure, there is no difference between the gas flow A and the gas flow A'.

According to the sixth embodiment, in addition to the same advantages as in the first embodiment and the fifth embodiment, the oppositely oriented discharge ports 27B and 27D that form the gas flow A' in the same direction as the flow direction of the treatment target water 6 are provided, whereby the device configuration can be simplified while obtaining a certain advantage relating to water treatment efficiency, and a length of the circulation pipe 25 can be reduced in comparison with the fifth embodiment.

Seventh Embodiment

Figure 9:
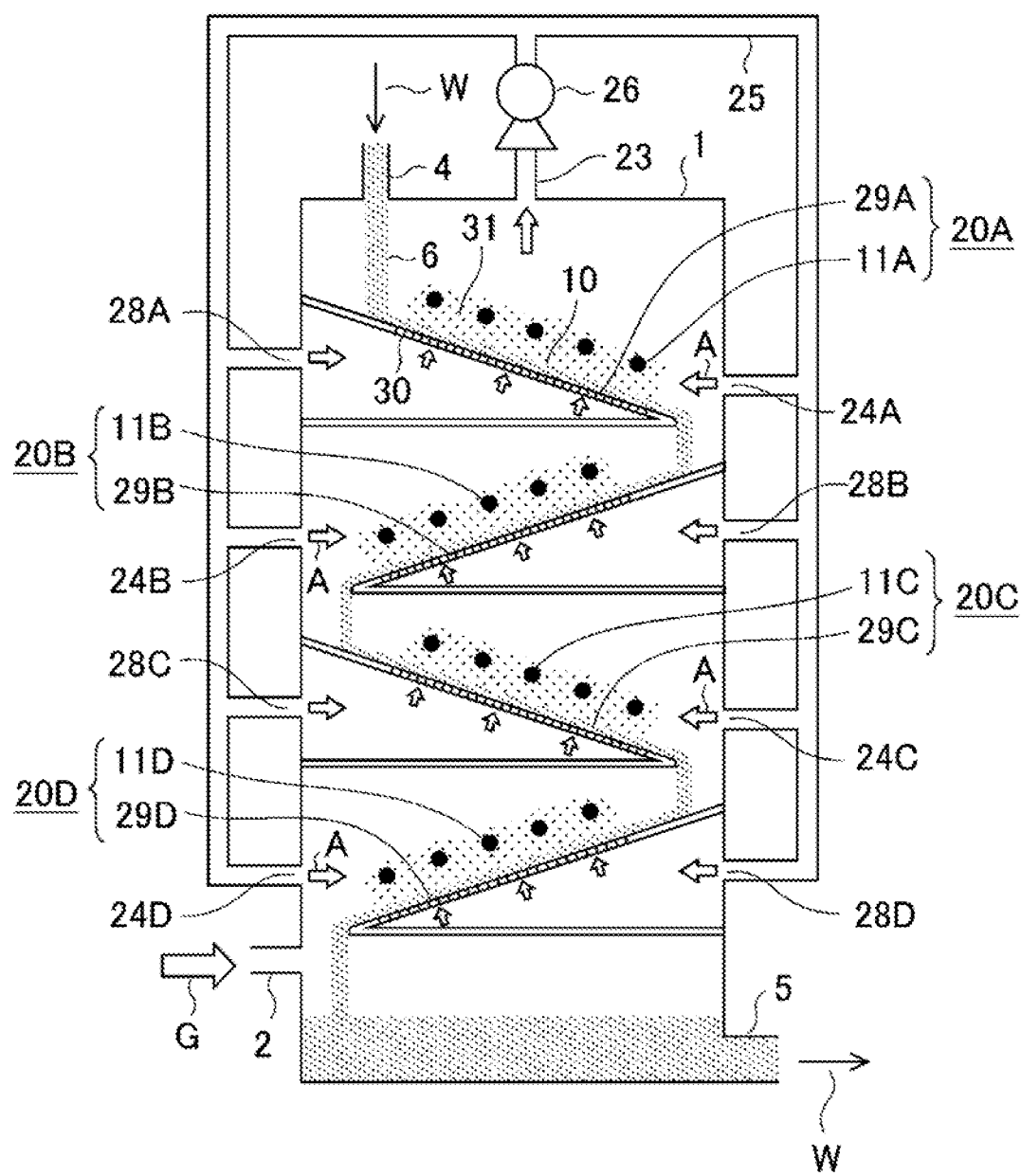
FIG. 9 is a sectional view showing a main configuration of a water treatment device according to a seventh embodiment of the invention.

FIG. 9 is a sectional view schematically showing a main configuration of a water treatment device according to a seventh embodiment of the invention. In the second embodiment to the sixth embodiment, the grounding electrode 7 configuring each unit 20 is of a plate form, but in the seventh embodiment, grounding electrodes 29A, 29B, 29C, and 29D (collectively referred to as grounding electrodes 29) configuring each unit 20 are of a hollow triangular cylinder form whose sectional form is practically a right-angled triangle.

The form and a disposition of the grounding electrode 29 will be described in detail using FIG. 9. The grounding electrode 29 is such that a cross-section is practically formed as a right-angled triangle seen from a front side in the plane of FIG. 9, the grounding electrode 29 is installed with an inclined face on an upper side and a horizontal bottom face on a lower side, and a vertical face is positioned on a side face of the treatment tank 1. Ejection gas feed ports 28A, 28B, 28C, and 28D (collectively referred to as ejection gas feed ports 28) are provided in the vertical face.

The grounding electrodes 29A and 29C are such that the vertical face positioned on a left side in FIG. 9 is fixed to the left side face of the treatment tank 1, and an apex angle end portion positioned on a right side is distanced from the right side face of the treatment tank 1. In the same way, the grounding electrodes 29B and 29D are such that the vertical face positioned on a right side is fixed to the right side face of the treatment tank 1, and an apex angle end portion positioned on a left side is distanced from the left side face of the treatment tank 1. Because of this, the treatment target water 6 flows down as a continuous flow along a flowing water portion formed of the inclined face of each of the grounding electrodes 29A, 29B, 29C, and 29D.

Also, the flowing water portion of the grounding electrode 29 has a large number of minute holes 30 that have ventilating properties, and an gas flow biased by the blower 26 is fed from a back surface side of the flowing water portion through each of the ejection gas feed ports 28, whereby the treatment target water 6 is sprayed upward as minute water droplets 31 of or near a mist form, and a layer of the minute water droplets 31 of the treatment target water 6 is formed above the flowing water portion. A dimension of the minute hole 30 is desirably a diameter of 0.1 mm or more, 1 mm or less. When the diameter is less than 0.1 mm, the minute hole 30 is liable to be blocked, and when the diameter exceeds 1 mm, distribution of the gas flew occurs in a cross-section of the minute hole 30, and forming the minute water droplets 31 uniformly becomes difficult.

Also, generally, a diameter of the minute water droplet 31 is desirably 1 μm or more, 1 mm or less. When the water droplet diameter is less than 1 μm, since the volume of the minute water droplet 31 is small and the reaction of the formula (6) and formula (7) immediately saturates, the efficiency of the reaction is liable to decrease, and when the diameter exceeds 1 mm, there is a high possibility of a spark discharge being generated when the minute water droplet 31 adheres to the high voltage electrode 11.

The circulation pipe 25 communicating with the intake portion of the blower 26 is attached to the circulating gas exit 23 formed in the upper face of the treatment tank 1. The circulation pipe 25 connected to a discharge side of the blower 26 branches to the left and right toward a downstream side. The circulation pipe 25 branching on the left side of the treatment tank 1 further branches into four systems, which are connected one each to the gas feed porta 28A and 28C and the discharge ports 24B and 24D. Also, the circulation pipe 25 branching on the right side of the treatment tank 1 further branches into four systems, which are connected one each to the communicating ejection gas feed ports 28B and 28D and the discharge ports 24A and 24C.

When the blower 26 is activated in the water treatment device according to the seventh embodiment, one portion of gas taken into the circulation pipe 25 from the inside of the treatment tank 1 via the circulating gas exit 23 is fed into the hollow interior of the grounding electrode 29 through each eject ion gas feed port 28, and discharged upward from the minute holes 30 formed in each inclined face. At this time, one portion of the water film 10 flowing down the inclined face of the grounding electrode 29 is sprayed upward as the minute water droplets 31. At the same time, one portion of the gas taken into the circulation pipe 25 from the inside of the treatment tank 1 is discharged from each discharge port 24, and forms the gas flow A in a direction opposite to the flow direction of the treatment target water 6 with respect to each high voltage electrode 11.

In the seventh embodiment, one portion of the water film 10 formed by the treatment target water 6 flowing down the inclined face of the grounding electrode 29 is sprayed upward as the minute water droplets 31, whereby an area of contact between an electrical discharge formed bet ween the high voltage electrode 11 and the grounding electrode 29 and the treatment target water 6 increases. As a result of this, the reaction of formula (5) occurs frequently. Also, the water film 10 is agitated when the gas is discharged from the minute holes 30, because of which the density of ozone, hydrogen peroxide, organic matter, or the like dissolved in the treatment target water 6 is uniformized, and the reaction of formula (9) occurs frequently.

Furthermore, the gas discharged from the minute holes 30 has been taken in from inside the treatment tank 1, because of which the gas includes ozone and hydrogen peroxide generated by an electrical discharge. By gas including ozone and hydrogen peroxide coming into contact with the water film 10, the reactions of formula (6) and formula (7) occur frequently. Consequently, owing to the minute water droplets 31 being formed, the speed and efficiency of water treatment increase in comparison with a case in which the minute water droplets 31 are not formed.

Owing to the minute water droplets 31 being formed, water droplets adhering to the high voltage electrode 11 increase, but one portion of gas taken in from inside the treatment tank 1 is blown against the high voltage electrode 11 through the discharge port 24, because of which water droplets adhering to the high voltage electrode 11 are blown away by the gas flow pressure. That is, even when water droplets adhere to the high voltage electrode 11 in accompaniment to the formation of the minute water droplets 31, the water droplets are swiftly removed, because of which a spark discharge can be restricted. In the seventh embodiment, gas fed to the ejection gas feed port 28 is biased by the blower 26, but blowing means for forming the minute water droplets 31 may be prepared separately.

According to the seventh embodiment, in addition to the same advantages as in the first embodiment and the fifth embodiment, the minute holes 30 are provided in the flowing water portion of the grounding electrode 29, and the minute water droplets 31 are formed from one portion of the water film 10, whereby still more efficient and faster water treatment can be carried out.

Eighth Embodiment

Figure 10:
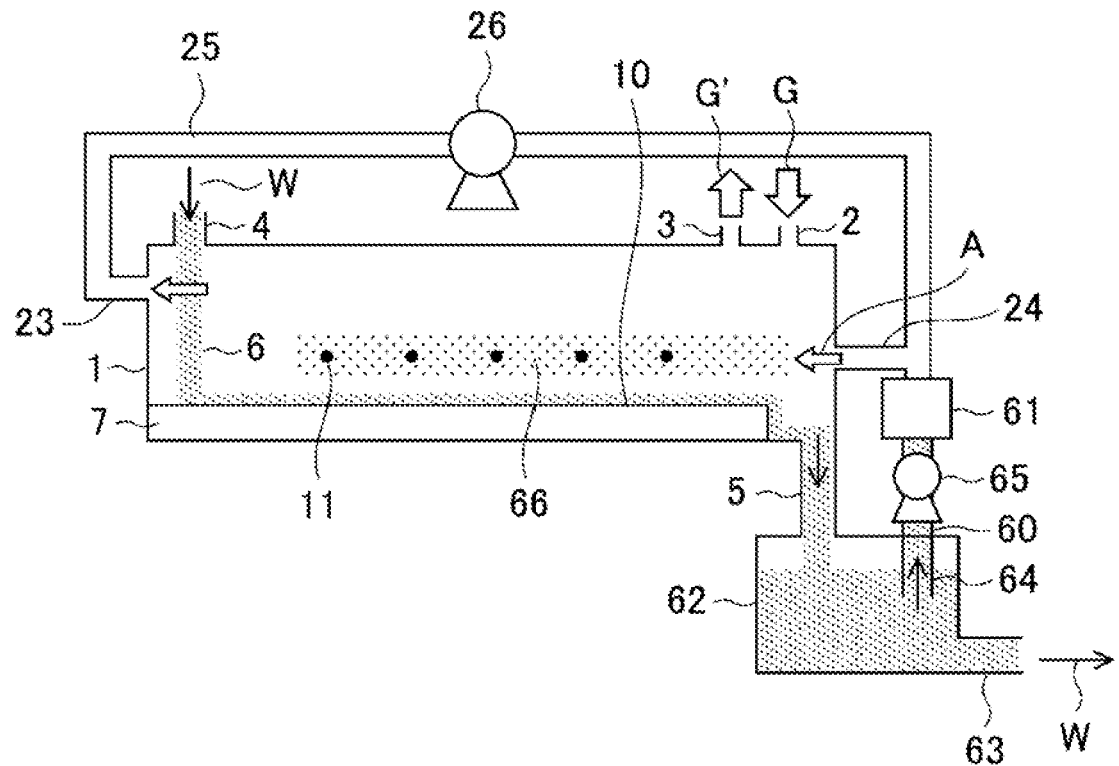
FIG. 10 is a sectional view showing a main configuration of a water treatment device according to an eighth embodiment of the invention.

FIG. 10 is a sectional view schematically showing a main configuration of a water treatment device according to an eighth embodiment of the invention. The water treatment device according to the eighth embodiment includes a water circulation pipe 60 that causes the treatment target water 6 that flows down through the unit 20 to circulate inside the treatment tank 1, and minute water droplet supply means 61 that forms the treatment target water 6 into minute water droplets and supplies the minute water droplets to the gas flow A formed by blowing means (the blower 26 in FIG. 10).

The water treatment device according to the eighth embodiment includes one unit configured of the plate form grounding electrode 7 and a multiple of the high voltage electrodes 11. The treatment tank 1 is such that the circulating gas exit 23 is provided in the left side face, and the discharge port 24 that induces the gas flow A is provided at a height in the right side face between the high voltage electrode 11 and the grounding electrode 7. The circulation pipe 25 that connects the circulating gas exit 23 and the discharge port 24 is provided on the exterior of the treatment tank 1, and the blower 26 is disposed partway along the circulation pipe 25.

Also, a water storage tank 62 that temporarily stores the treatment target water 6 after treatment discharged from the water discharge port 5 is provided on the exterior of the treatment tank 1. The water storage tank 62 has a water discharge port 63 in a bottom portion, and has a water circulation port 64 in an upper portion. A water circulation pump 65, and the minute water droplet supply means 61 disposed further than the water circulation pump 65 to the discharge port 24 side, are disposed in the water circulation pipe 60, which connects the water circulation port 64 and the discharge port 24.

When the water circulation pump 65 is activated in the water treatment device according to the eighth embodiment, the treatment target water 6 from inside the water storage tank 62 taken in from the water circulation port 64 passes through the water circulation pipe 60, and is supplied to the minute water droplet supply means 61. The treatment target water 6 supplied to the minute water droplet supply means 61 is supplied as minute water droplets 66 to the discharge port 24, and is supplied between the high voltage electrode 11 and the grounding electrode 7 together with gas discharged from the discharge port 24.

By one portion of the treatment target water 6 being supplied as the minute water droplets 66 to a vicinity of the high voltage electrode 11 in this way, an area of contact between an electrical discharge formed between the high voltage electrode 11 and the grounding electrode 7 and the treatment target water 6 increases. As a result of this, the reaction of formula (5) occurs, and a slight amount of organic matter remaining in the treatment target water 6 after treatment is further degraded and removed. Also, the reactions of formula (6) and formula (7) occur frequently owing to the minute water droplets 66 coming into contact with a gas including ozone and hydrogen peroxide. Consequently, owing to the minute water droplets 66 being supplied, the speed and efficiency of water treatment increase in comparison with a case in which the minute water droplets 66 are not supplied.

Owing to the minute water droplets 66 being supplied, water droplets adhering to the high voltage electrode 11 increase, but gas taken in from inside the treatment tank 1 is blown against the high voltage electrode 11 through the discharge port 24, because of which water droplets adhering to the high voltage electrode 11 are blown away by the gas flow pressure. That is, even when water droplets adhere to the high voltage electrode 11 in accompaniment to the formation of the minute water droplets 66, the water droplets are swiftly removed, because of which a spark discharge can be restricted.

The minute water droplet supply means 61 not being particularly limited provided that the treatment target water 6 can be formed into minute water droplets thereby, various methods are applicable. For example, a shower nozzle, a single-fluid nozzle, a two-fluid nozzle, an ultrasonic oscillator, an ultrasonic homogenizer, a splashing mechanism that mechanically splashes the treatment target water 6 to form water droplets, a recoil mechanism that drops the treatment target water 6, or causes the treatment target water 6 to collide with a wall face, to form water droplets, or the like, is applicable. A diameter of the minute water droplet 66 is preferably 100 μm or less, as the minute water droplets 66 are then diffused together with gas over a wide range of the treatment tank 1.

Also, in the eighth embodiment, the minute water droplet supply means 61 is provided on the exterior of the treatment tank 1, but the minute water droplet supply means 61 can also be installed in the interior of the treatment tank 1. In this case, the minute water droplets 66 are supplied to the gas flow A generated by the blowing device 14 (refer to FIG. 1) in the interior of the treatment tank 1. When the minute water droplet supply means 61 is installed in the interior of the treatment tank 1, loss of the minute water droplets 66 due to collision with an inner wall of the discharge port 24 can be restricted. Also, in the eighth embodiment, the treatment target water 6 that has flowed down through the unit is supplied as the minute water droplets 66, but the same advantage can be obtained by the treatment target water 6 before treatment being supplied. Also, the reactions of formula (6) and formula (7) also occur frequently when water other than the treatment target water 6 is supplied, whereby an advantage is obtained in that water treatment efficiency and water treatment speed are increased.

According to the eighth embodiment, in addition to the same advantages as in the first embodiment, one portion of the treatment target water 6 is supplied by the minute water droplet supply means 61 to a vicinity of the high voltage electrode 11 as the minute water droplets 66, because of which still faster and more efficient water treatment can be carried out.

Ninth Embodiment

Figure 11:
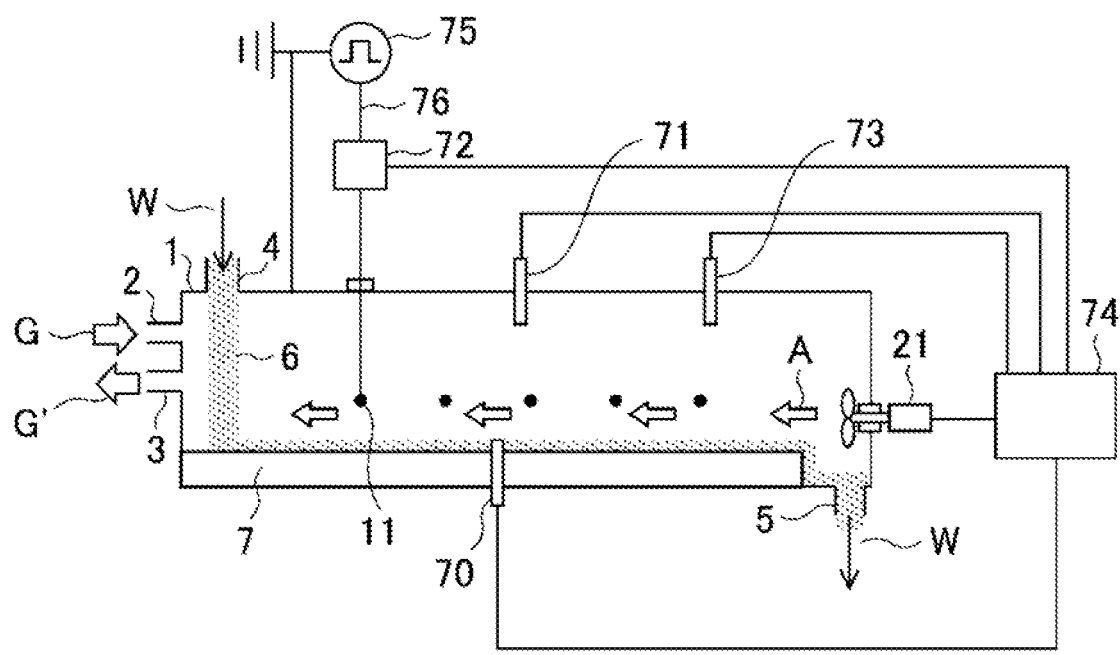
FIG. 11 is a sectional view showing a main configuration of a water treatment device according to a ninth embodiment of the invention.

FIG. 11 is a sectional view schematically showing a main configuration of a water treatment device according to a ninth embodiment of the invention. The water treatment device according to the ninth embodiment of the invention includes as internal environment measurement means of the treatment tank 1 a thermometer 70 that measures a temperature of the treatment target water 6 inside the treatment tank 1, a thermohygrometer 71 that measures a temperature and a humidity inside the treatment tank 1, electrical characteristic measurement means 72 that measures electrical characteristics of the high voltage electrode 11, and a photometer 73 that measures an intensity of light emitted by the electrical discharge 18 in the interior of the treatment tank 1, and also includes a gas flow control unit 74 that regulates an amount of gas fed by blowing means (the propeller unit 21 in FIG. 11) based on a result of measurement by the internal environment measurement means.

In the example shown in FIG. 11, the thermometer 70, the thermohygrometer 71, the electrical characteristic measurement means 72, and the photometer 73 are included as the internal environment measurement means, but it is sufficient that at least one of these is included. Also, the thermohygrometer 71 may be an instrument that measures either one of the temperature or humidity (dew point) inside the treatment tank 1.

As shown in FIG. 11, the thermometer 70 is provided in the grounding electrode 7, and the thermohygrometer 71 and the photometer 73 are provided in an upper portion of the interior of the treatment tank 1. Also, the electrical characteristic measurement means 72 is provided in an electrical wire 76 that connects the high voltage electrode 11 and a pulse power supply 75 on the exterior of the treatment tank 1. Signals output from the thermometer 70, the thermohygrometer 71, the electrical characteristic measurement means 72, and the photometer 73 are each input into the gas flow control unit 74. The gas flow control unit 74 controls the amount of the gas flow A formed by the propeller unit 21 based on each signal received. As other configurations, an operation, a water treatment principle, and the like of the water treatment device according to the ninth embodiment are the same as in the first embodiment, a description will be omitted.

Figure 12:
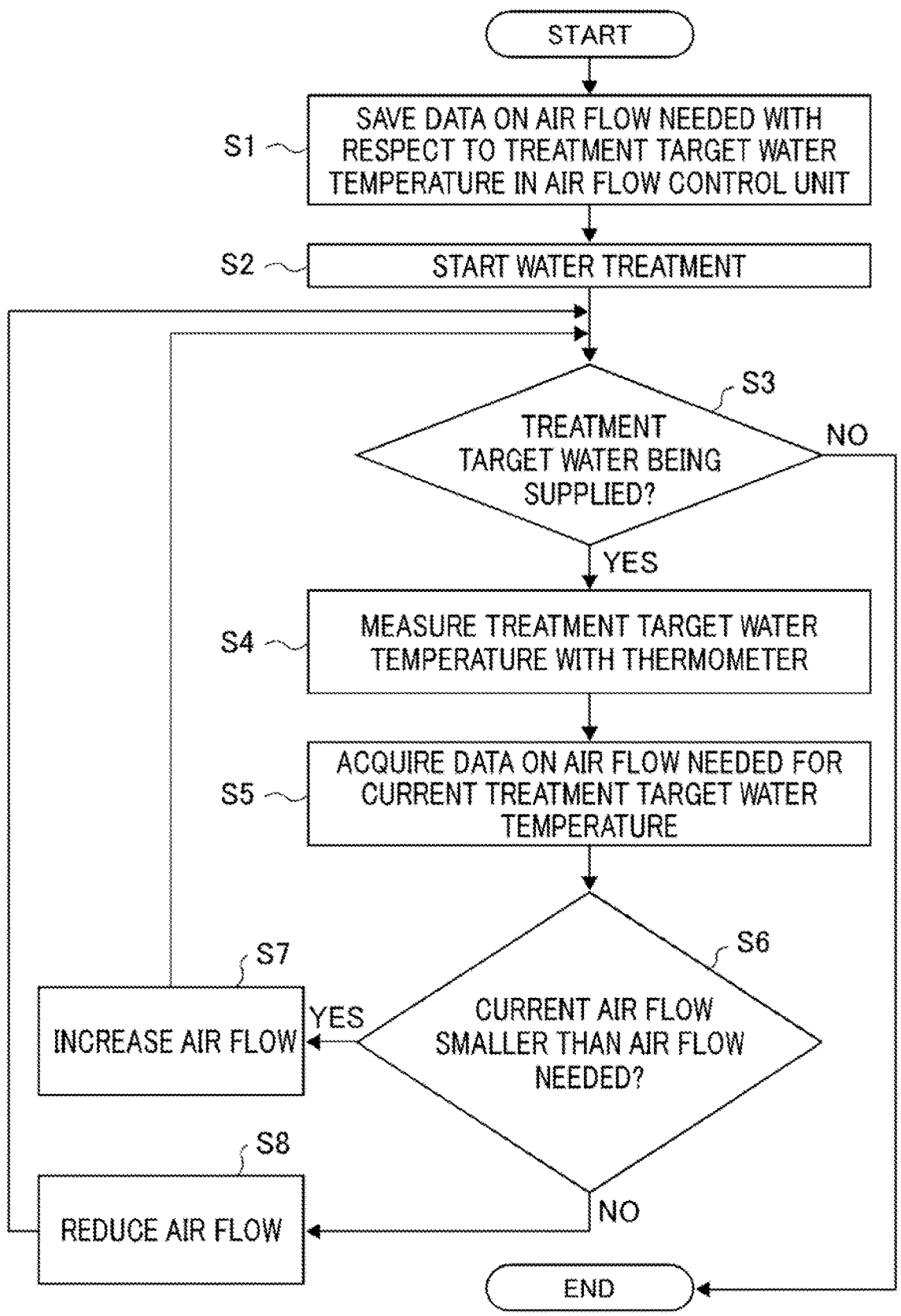
FIG. 12 is a diagram showing a procedure of controlling an amount of gas fed using a thermometer in the water treatment device according to the ninth embodiment of the invention.

A procedure of controlling an amount of gas fed using a thermometer in the water treatment device according to the ninth embodiment will be described using a flowchart of FIG. 12. Firstly, in step S1, amounts of gas needed for various temperatures of the treatment target water 6 envisaged when carrying out water treatment are obtained by measuring in advance, and data on the amount of gas needed with respect to the temperature of the treatment target water 6 are saved in the gas flow control unit 74. Water droplets formed on the high voltage electrode 11 are such that a frequency of formation and a dimension change in accordance with an amount of moisture in the gas flow A, because of which the frequency of formation and the dimension of water droplets formed on the high voltage electrode 11 depend on a vapor pressure, that is, the temperature, of the treatment target water 6.

When the temperature of the treatment target water 6 increases, the frequency of water droplet formation increases, and the dimension increases, because of which an increase in the amount of gas fed is needed in order to blow away the water droplets using gas flow pressure. Meanwhile, when the temperature of the treatment target water 6 decreases, the frequency of water droplet formation decreases, and the dimension decreases, because of which a small amount of gas is sufficient. As the amount of gas needed is determined depending on the temperature of the treatment target water 6 in this way, experiment is carried out in advance, and data are saved.

Next, in step S2, the treatment target water 6 is supplied from the water supply port 4, and water treatment is started. Continuing, when the treatment target water 6 is being supplied in step S3 (YES), the procedure advances to step S4, and the temperature of the treatment target water 6 is measured by the thermometer 70. Continuing, in step S5, the gas flow control unit 74 acquires data saved in advance on the amount of gas needed for the current temperature of the treatment target water 6, and in step S6, the gas flow control unit 74 compares a current amount of gas and the necessary amount of gas acquired in step S5.

When the current amount of gas is smaller than the necessary amount of gas in step S6 (YES), the procedure advances to step S7, and the amount of gas is increased. Meanwhile, when the current amount of gas is greater than the necessary amount of gas in step S6 (NO), the procedure advances to step S8, and the amount of gas is reduced. The heretofore described process is continuously or discretely repeated until the supply of the treatment target water 6 ends in step S3.

Figure 13:
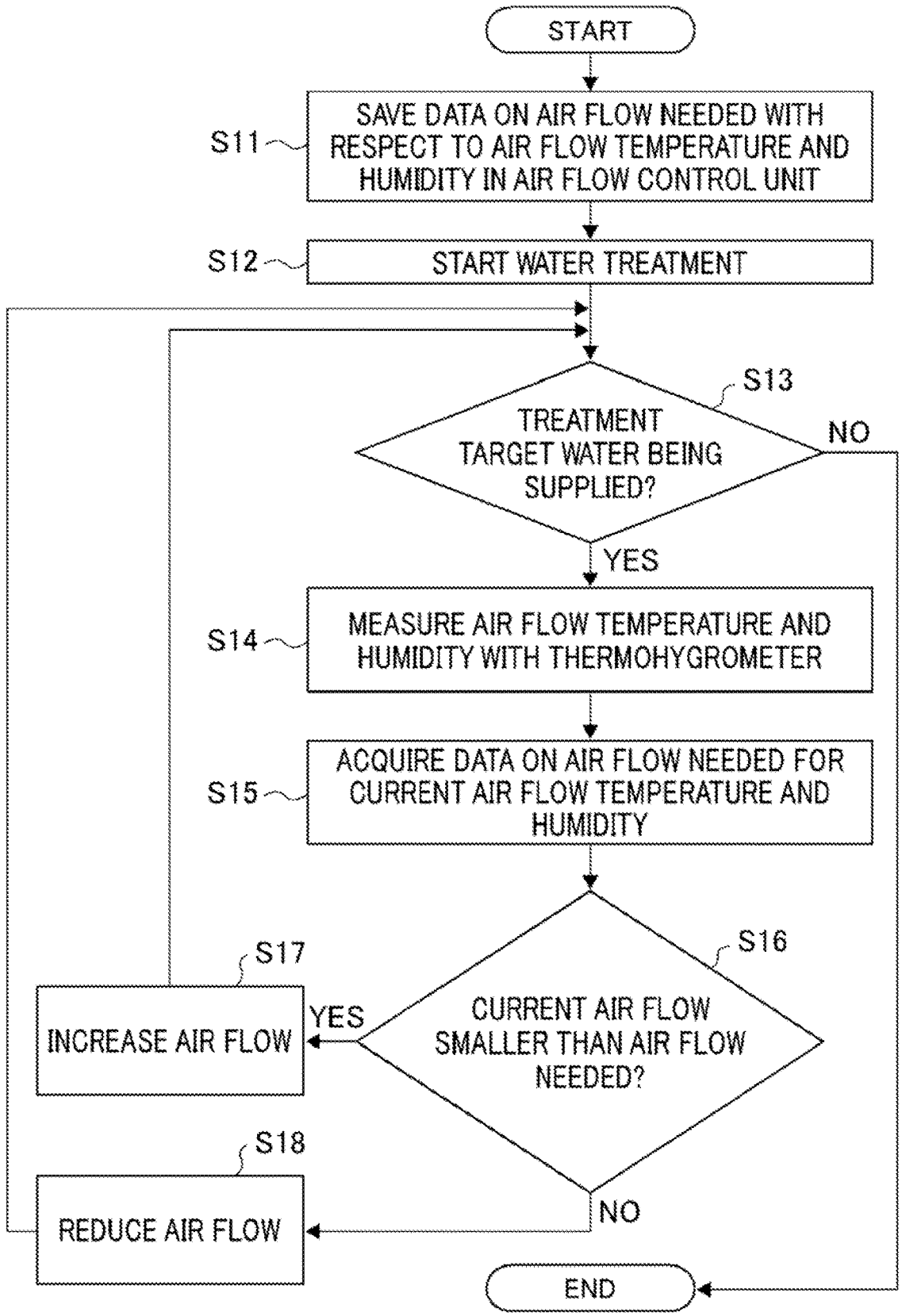
FIG. 13 is a diagram showing a procedure of controlling an amount of gas fed using a thermohygrometer in the water treatment device according to the ninth embodiment of the invention.

Next, a procedure of controlling an amount of gas fed using the thermohygrometer 71 will be described using a flowchart of FIG. 13. Firstly, in step S11, amounts of gas needed for various temperatures and humidities of the gas flow A envisaged when carrying out water treatment are obtained by measuring in advance, and data on the amount of gas needed with respect to the temperature and humidity of the gas flow A are saved in the gas flow control unit 74. Water droplets formed on the high voltage electrode 11 are such that the frequency of formation and the dimension change in accordance with the amount of moisture in the gas flow A, because of which the frequency of formation and the dimension of water droplets formed on the high voltage electrode 11 depend on the amount of moisture in the gas flow A, that is, the temperature and humidity of the gas flow A.

When the amount of moisture in the gas flow A increases, the frequency of water droplet formation increases, and the dimension increases, because of which an increase in the amount of gas fed is needed in order to blow away the water droplets using gas flow pressure. Meanwhile, when the amount of moisture in the gas flow A decreases, the frequency of water droplet formation decreases, and the dimension decreases, because of which a small amount of gas is sufficient. As the amount of gas needed is determined depending on the temperature and humidity of the gas flow A in this way, experiment is carried out in advance, and data are saved.

Continuing, in step S12, the treatment target water 6 is supplied from the water supply port 4, and water treatment is started. Next, when the treatment target water 6 is being supplied in step S13 (YES), the procedure advances to step S14, and the temperature and humidity of the gas flow A is measured by the thermohygrometer 71. Continuing, in step S15, the gas flow control unit 74 acquires data saved in advance on the amount of gas needed for the current temperature and humidity of the gas flow A, and in step S16, the gas flow control unit 74 compares the current amount of gas and the necessary amount of gas acquired in step S15.

When the current amount of gas is smaller than the necessary amount of gas in step S16 (YES), the procedure advances to step S17, and the amount of gas is increased. Meanwhile, when the current amount of gas is greater than the necessary amount of gas in step S16 (NO), the procedure advances to step S18, and the amount of gas is reduced. The heretofore described process is continuously or discretely repeated until the supply of the treatment target water 6 ends in step S13. In the flowchart of FIG. 13, the example shown is such that the amount of gas is controlled using temperature and humidity data of the gas flow A, but the amount of gas can also be controlled using either one of the temperature or the humidity.

Figure 14:
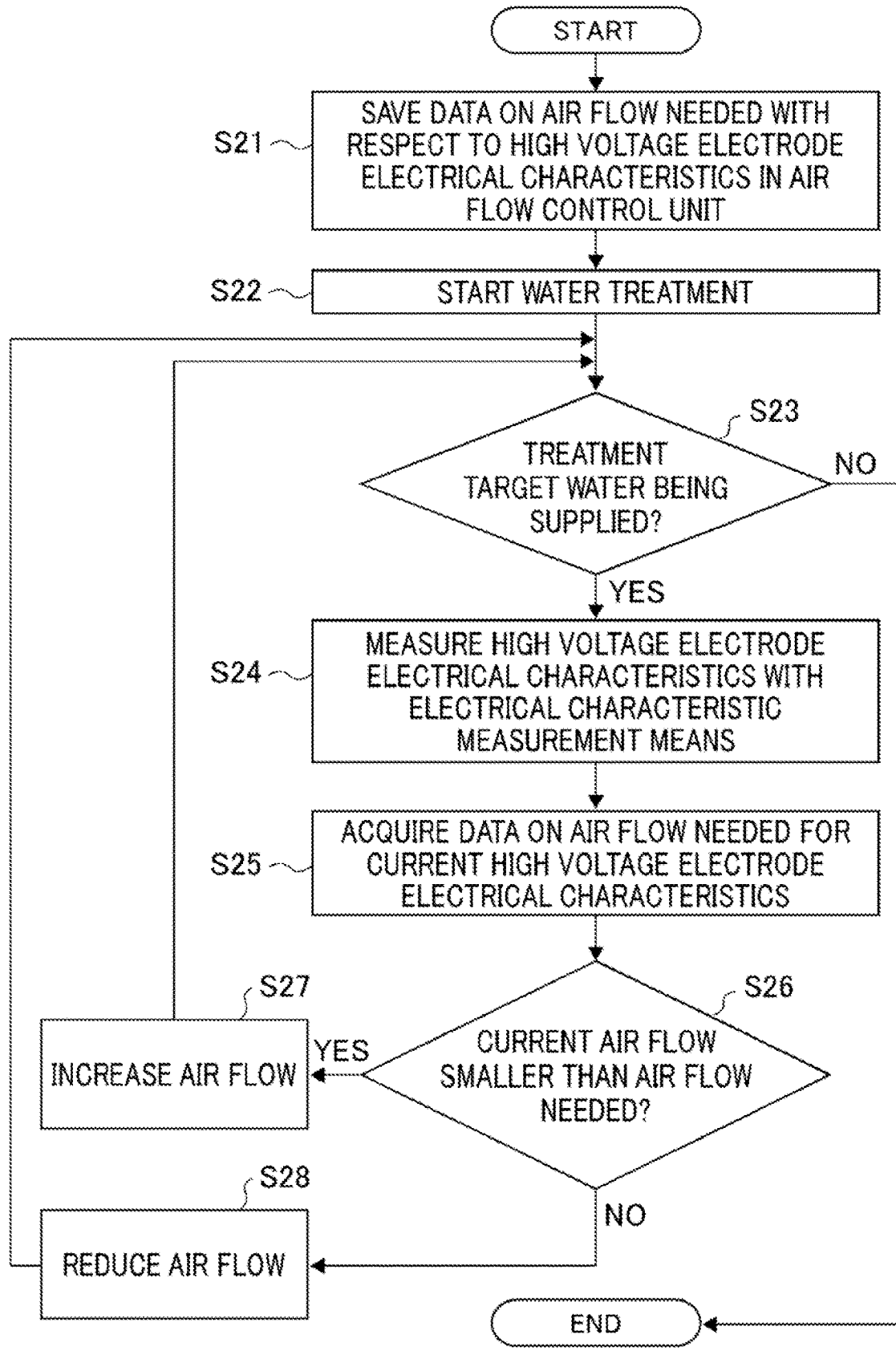
FIG. 14 is a diagram showing a procedure of controlling an amount of gas fed using electrical characteristic measurement means in the water treatment device according to the ninth embodiment of the invention.

Next, a procedure of controlling an amount of gas fed using the electrical characteristic measurement means 72 will be described using a flowchart of FIG. 14. In step S21, an amount of gas needed with respect to electrical characteristics input into the high voltage electrode 11 is obtained by measuring in advance, and data on the amount of gas needed with respect to the electrical characteristics are saved in the gas flow control unit 74. An electrical field distribution between the high voltage electrode 11 and the grounding electrode 7 changes depending on a state of water droplet formation on the high voltage electrode 11, as described in the first embodiment. That is, because electrical characteristics (voltage, current, and power) when voltage is input into the high voltage electrode 11 from the pulse power supply 75 change depending on the state of water droplet formation on the high voltage electrode 11, the necessary amount of gas is determined in accordance with the electrical characteristics.

Continuing, in step S22, the treatment target water 6 is supplied from the water supply port 4, and water treatment is started. Next, when the treatment target water 6 is being supplied in step S23 (YES), the procedure advances to step S24, and the electrical characteristics of the high voltage electrode 11 are measured by the electrical characteristic measurement means 72. Continuing, in step S25, the gas flow control unit 74 acquires data saved in advance on the amount of gas needed for the current electrical characteristics of the high voltage electrode 11, and in step S26, the gas flow control unit 74 compares the current amount of gas and the necessary amount of gas acquired in step S25.

When the current amount of gas is smaller than the necessary amount of gas in step S26 (YES), the procedure advances to step S27, and the amount of gas is increased. Meanwhile, when the current amount of gas is greater than the necessary amount of gas in step S26 (NO), the procedure advances to step S28, and the amount of gas is reduced. The heretofore described process is continuously or discretely repeated until the supply of the treatment target water 6 ends in step S23.

Figure 15:
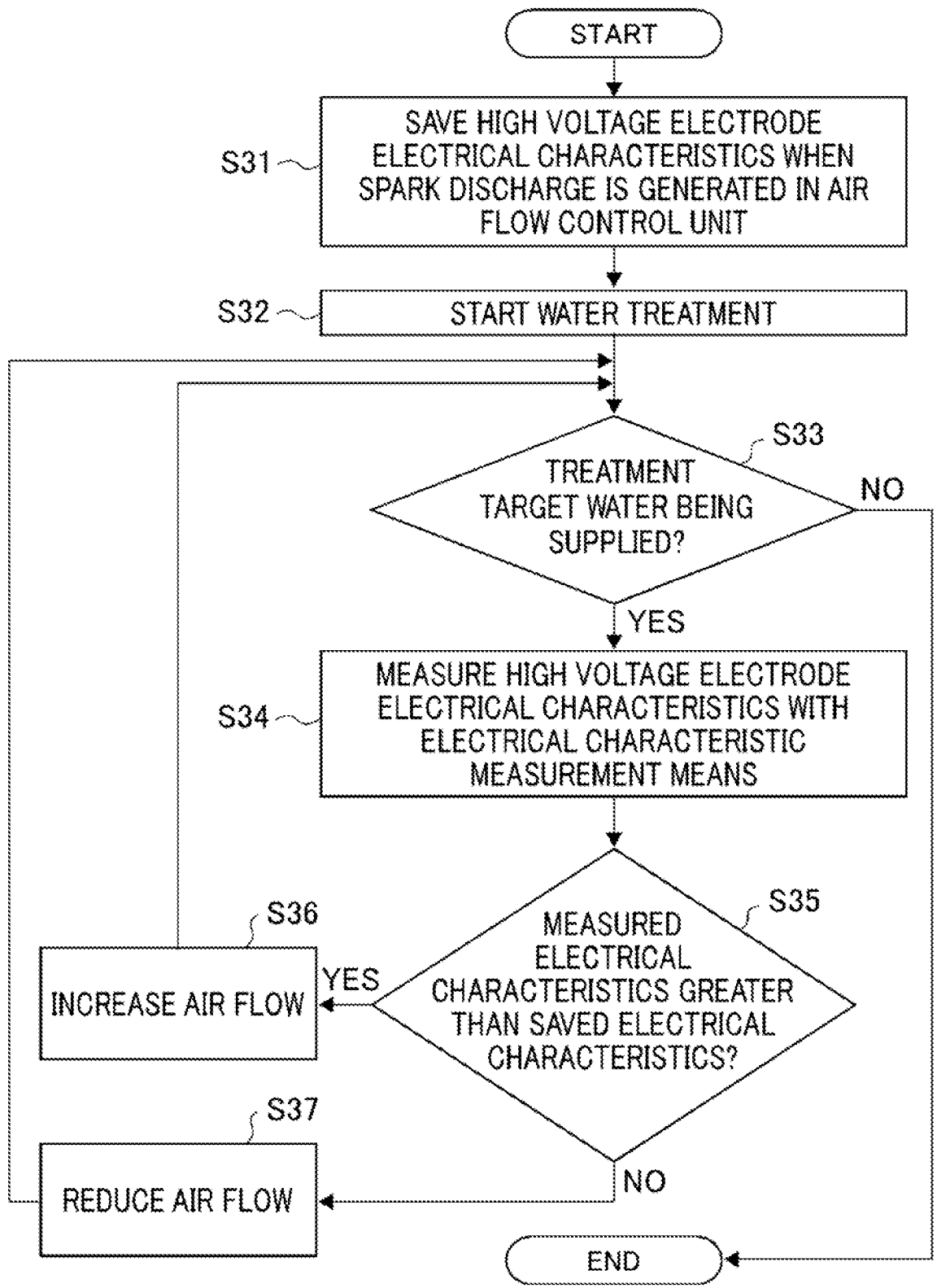
FIG. 15 is a diagram showing a procedure of controlling an amount of gas fed using the electrical characteristic measurement means in the water treatment device according to the ninth embodiment of the invention.

Also, as another control method using the electrical characteristic measurement means 72, an amount of gas can also be controlled using a procedure shown in a flowchart of FIG. 15. In step S31, electrical characteristics when a spark discharge is generated at the high voltage electrode 11 are obtained by measuring in advance, and threshold value data thereof are saved in the gas flow control unit 74. When water droplets are formed on the high voltage electrode 11 and a spark discharge is generated, current and power flowing into the high voltage electrode 11 are momentarily increased. Consequently, a momentary increase of the electrical characteristics is measured, whereby the generation of the spark discharge can be detected.

Next, in step S32, the treatment target water 6 is supplied from the water supply port 4, and water treatment is started. Continuing, when the treatment target water 6 is being supplied in step S33 (YES), the procedure advances to step S34, and the electrical characteristics of the high voltage electrode 11 are measured by the electrical characteristic measurement means 72. Furthermore, in step S35, the measured electrical characteristics and the threshold data of the electrical characteristics when a spark discharge is generated saved in step S31 are compared.

When the measured electrical characteristics are greater than the threshold data of the electrical characteristics when a spark discharge is generated in step S35 (YES), a spark discharge is being generated, because of which the procedure advances to step S36, and the amount of gas is increased. Meanwhile, when the measured electrical characteristics are smaller than the threshold data in step S35 (NO), the procedure advances to step S37, and the amount of gas is reduced. The heretofore described process is continuously or discretely repeated until the supply of the treatment target water 6 ends in step S33.

Figure 16:
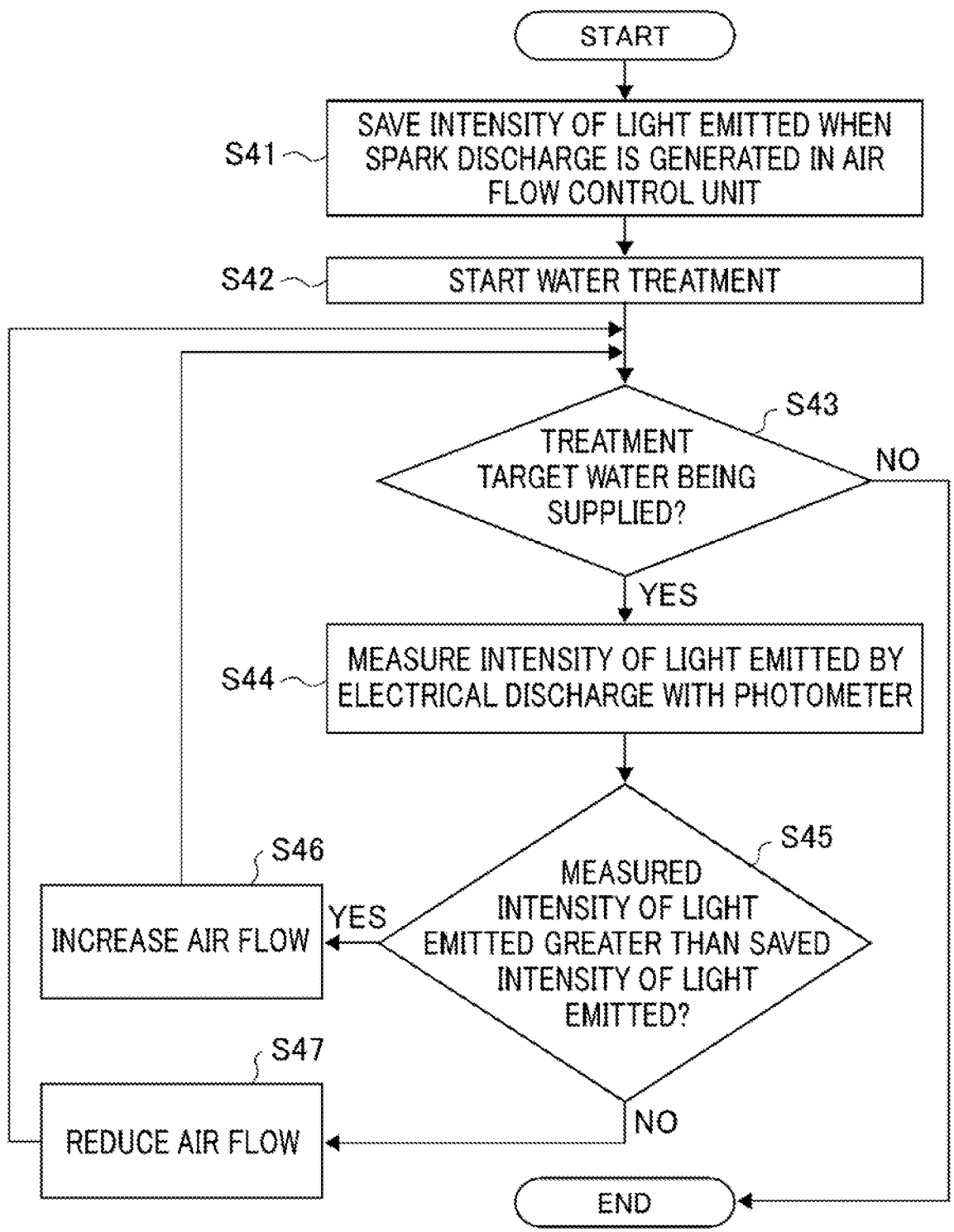
FIG. 16 is a diagram showing a procedure of controlling an amount of gas fed using a photometer in the water treatment device according to the ninth embodiment of the invention.

Next, a procedure of controlling an amount of gas fed using the photometer 73 will be described using a flowchart of FIG. 16. In step S41, an intensity of light emitted when a spark discharge is generated is obtained by measuring in advance, and threshold value data thereof are saved in the gas flow control unit 74. When water droplets are formed on the high voltage electrode 11 and a spark discharge is generated, the intensity of light emitted from the electrical discharge is momentarily increased. Consequently, a change in the intensity of light emitted from the electrical discharge is measured, whereby the generation of the spark discharge can be detected.

Continuing, in step S42, the treatment target water 6 is supplied from the water supply port 4, and water treatment is started. Next, when the treatment target water 6 is being supplied in step S43 (YES), the procedure advances to step S44, and the intensity of light emitted from the electrical discharge is measured by the photometer 73. Furthermore, in step S45, the measured intensity of light emitted and the threshold data of the intensity of light emitted when a spark discharge is generated saved in step S41 are compared.

When the measured intensity of light emitted is greater than the threshold data of the intensity of light emitted when a spark discharge is generated in step S45 (YES), a spark discharge is being generated, because of which the procedure advances to step S46, and the amount of gas is increased. Meanwhile, when the measured intensity of light emitted is smaller than the threshold data in step S45 (NO), the procedure advances to step S47, and the amount of gas is reduced. The heretofore described process is continuously or discretely repeated until the supply of the treatment target water 6 ends in step S43.

In this way, the water treatment device according to the ninth embodiment controls the amount of gas fed based on results of measurements by the thermometer 70, the thermohygrometer 71, the electrical characteristic measurement means 72, and the photometer 73 acting as the internal environment measurement means of the treatment tank 1, whereby a minimum amount of the gas flow A needed for blowing away water droplets adhering to the high voltage electrode 11 can constantly be fed in accordance with the state inside the treatment tank 1, and power consumption of the propeller unit 21 can be restricted.

Furthermore, by the amount of gas fed being restricted to the minimum, power supplied to the gas flow A per unit volume can be increased, and a frequency of a radical in the gas flow colliding with an inner wall of the treatment tank 1 and degrading can be restricted, because of which the amount of radicals in the gas flow per unit volume increases, the reactions of formula (6) and formula (7) can be caused to occur frequently, and fast water treatment can be carried out.

It not being necessary to include ail of the thermometer 70, the thermohygrometer 71, the electrical characteristic measurement means 72, and the photometer 73, the gas flow may be controlled using any one thereof. However, combining a multiple thereof enables the gas flow to be controlled with high precision, and a spark discharge can be reliably restricted.

General temperature measurement means such as a thermocouple, a resistance thermometer, a non-contact thermometer, a liquid-in-glass thermometer, or a bimetal thermometer can be used as the thermometer 70 used in the ninth embodiment. Also, general temperature measurement means such as a thermocouple, a resistance thermometer, a non-contact thermometer, a liquid-in-glass thermometer, or a bimetal type, and general humidity measurement means such as an extendable type, a bimetal type, or an electric type, can be used as the thermohygrometer 71.

Also, general electrical characteristic measurement means such as a high voltage probe of a resistive voltage division type, a conversion type, or the like, a current probe of an induction type or a current division type, or a method using an electro-optical or magneto-optical effect, can be used as the electrical characteristic measurement means 72. General light measurement means, such as means that utilizes a photoelectric effect or means that utilizes a semiconductor photodetector, can be used as the photometer 73.

According to the ninth embodiment, in addition to the same advantages as in the first embodiment, the amount of the gas flow A is optimized, whereby a spark discharge can be efficiently restricted, and the power consumption of the propeller unit 21 can be restricted, in addition to which the amount of radicals in the gas flow per unit volume increases, and fast water treatment can be carried out. The embodiments of the invention can be freely combined, and each embodiment can be modified or abbreviated as appropriate, without departing from the scope of the invention.

The invention claimed is:

1. A water treatment device, comprising:
    a grounding electrode having a planar flowing water portion that causes treatment target water to flow;
    a multiple of high voltage electrodes provided parallel with the flowing water portion in a position distanced from the flowing water portion of the grounding electrode and so as to extend in a direction intersecting a flow direction of the treatment target water;
    a frame having a gas supply port that supplies a gas that generates a radical owing to an electrical discharge between the grounding electrode and the high voltage electrode, and a supply port and a discharge port of the treatment target water, and housing the grounding electrode and the high voltage electrode; and
    blowing means that induces a gas flow in an interior of the frame, wherein the blowing means comprises a gas blowing out portion from which gas is blown out, the gas blowing out portion opened in a direction opposite to the flow direction of the treatment target water, wherein
    the blowing means forms a gas flow with respect to an electrical discharge region, the region extending from the high voltage electrode to a surface of the treatment target water on the flowing water portion, the gas flow intersects an extension direction of the high voltage electrode and intersects with extension direction of the electrical discharge which formed from the high voltage electrode to the surface of the treatment target water on the flowing water portion.

2. The water treatment device according to claim 1, wherein the flowing water portion of the grounding electrode is inclined so as to become lower with respect to a horizontal plane toward a downstream side of the flow direction of the treatment target water.

3. The water treatment device according to claim 1, wherein the blowing means is installed so as to form a gas flow of a direction opposite to the flow direction of the treatment target water with respect to the electrical discharge region.

4. The water treatment device according to claim 1, wherein a multiple of the frame are stacked in a vertical direction, a unit including the grounding electrode and the high voltage electrode is housed in the interior of each of the frames, and the flow directions of the treatment target water in the units neighboring in the vertical direction are the same direction.

5. The water treatment device according to claim 1, wherein a multiple of a unit including the grounding electrode and the high voltage electrode are housed in a vertical direction in the interior of the frame, and the flow directions of the treatment target water in the units neighboring in the vertical direction are the same direction.

6. The water treatment device according to claim 1, wherein a multiple of a unit including the grounding electrode and the high voltage electrode are housed in a vertical direction in the interior of the frame, and the flow directions of the treatment target water in the units neighboring in the vertical direction are opposite directions.

7. The water treatment device according to claim 1, wherein the blowing means is a blowing device having a blowing fan, or a propeller unit having a fin rotated by a motor.

8. The water treatment device according to claim 7, wherein a multiple of a unit including the grounding electrode and the high voltage electrode are stacked in a vertical direction, and the blowing means is installed in each of the units.

9. The water treatment device according to claim 1, wherein the blowing means has a circulation passage that connects a circulating gas exit and a circulating gas discharge port provided in the frame on an exterior of the frame, and a blower disposed partway along the circulation passage.

10. The water treatment device according to claim 9, wherein a multiple of a unit including the grounding electrode and the high voltage electrode are housed in a vertical direction in the interior of the frame, the flow directions of the treatment target water in the units neighboring in the vertical direction are opposite directions, the circulating gas exit is provided in an upper face of the frame opposing an upstream side end portion of the treatment target water in the unit on an uppermost level, the circulating gas discharge port is provided in a side face of the frame opposing a downstream side end portion of the treatment target water in the unit on a lowermost level, and each of the units has a gas guiding member provided parallel to the grounding electrode on a side of the high voltage electrode opposite to that of the grounding electrode.

11. The water treatment device according to claim 9, wherein a multiple of a unit including the grounding electrode and the high voltage electrode are housed in a vertical direction in the interior of the frame, the flow directions of the treatment target water in the units neighboring in the vertical direction are opposite directions, the circulating gas exit is provided in an upper face of the frame opposing an upstream side end portion of the treatment target water in the unit on an uppermost level, and the circulating gas discharge port is provided in a side face of the frame opposing a downstream side end portion of the treatment target water in each of the units.

12. The water treatment device according to claim 9, wherein a multiple of a unit including the grounding electrode and the high voltage electrode are housed in a vertical direction in the interior of the frame, the flow directions of the treatment target water in the units neighboring in the vertical direction are opposite directions, the circulating gas exit is provided in an upper face of the frame opposing an upstream side end portion of the treatment target water in the unit on an uppermost level, one portion of a multiple of the circulating gas discharge port is provided in a side face of the frame opposing a downstream side end portion of the treatment target water in one portion of the units, a gas flow of a direction opposite to the flow direction of the treatment target water is formed, another one portion of the multiple of the circulating gas discharge port is provided in a side face of the frame opposing an upstream side end portion of the treatment target water in another one portion of the units, and a gas flow of a direction the same as the flow direction of the treatment target water is formed.

13. The water treatment device according to claim 9, wherein the grounding electrode has a multiple of minute holes in the flowing water portion, and a layer of minute water droplets of the treatment target water is formed above the flowing water portion by a gas flow biased by the blower or other blowing means being fed from a back face side of the grounding electrode.

14. The water treatment device according to claim 9, wherein the circulation passage includes minute water droplet supply means that supplies water droplets formed by the treatment target water being atomized to a gas flow formed by the blower.

15. The water treatment device according to claim 1, wherein the interior of the frame includes minute water droplet supply means that supplies water droplets formed by the treatment target water being atomized to a gas flow formed by the blowing means.

16. The water treatment device according to claim 1, comprising:
   internal environment measurement means including at least one of a thermometer that measures a temperature of the treatment target water in the interior of the frame, a thermohygrometer that measures a temperature and a humidity in the interior of the frame, electrical characteristic measurement means that measures electrical characteristics of the high voltage electrode, and a photometer that measures an intensity of light emitted by the electrical discharge in the interior of the frame; and
   a gas flow control unit that regulates an amount of gas fed by the blowing means based on a result of measurement by the internal environment measurement means.

17. A water treatment method whereby treatment target water and a gas that generates a radical owing to an electrical discharge are supplied to an interior of a frame in which a grounding electrode and a high voltage electrode are housed, an electrical discharge is generated between the grounding electrode and the high voltage electrode, and organic matter in the treatment target water is degraded and removed by a radical generated by the electrical discharge, the water treatment method comprising:
   a step of causing the treatment target water to flow over a planar flowing water portion of the grounding electrode;
   a step of applying a voltage to a multiple of the high voltage electrode provided parallel with the flowing water portion in a position distanced from the flowing water portion of the grounding electrode and so as to extend in a direction intersecting a flow direction of the treatment target water, thereby generating the electrical discharge between the grounding electrode and the multiple of the high voltage electrode; and
   a step of forming a gas flow with respect to an electrical discharge region from the high voltage electrode to a surface of the treatment target water on the flowing water portion, the gas flow intersects an extension direction of the high voltage electrode, and intersects with extension direction of the electrical discharge which formed from the high voltage electrode to the surface of the treatment target water on the flowing water portion, and is in a direction opposite to the flow direction of the treatment target water.

18. A water treatment device, comprising:

a grounding electrode having a planar flowing water portion that causes treatment target water to flow;

a multiple of high voltage electrodes provided parallel with the flowing water portion in a position distanced from the flowing water portion of the grounding electrode and so as to extend in a direction intersecting a flow direction of the treatment target water;

a frame having a gas supply port that supplies a gas that generates a radical owing to an electrical discharge between the grounding electrode and the high voltage electrode, and a supply port and a discharge port of the treatment target water, and housing the grounding electrode and the high voltage electrodes;

blowing means that induces a gas flow in an interior of the frame;

internal environment measurement means including at least one of a thermometer that measures a temperature of the treatment target water in the interior of the frame, a thermohygrometer that measures a temperature and a humidity in the interior of the frame, electrical characteristic measurement means that measures electrical characteristics of the high voltage electrode, and a photometer that measures an intensity of light emitted by the electrical discharge in the interior of the frame; and a gas flow control unit that regulates an amount of gas fed by the blowing means based on a result of measurement by the internal environment measurement means, wherein the blowing means forms a gas flow with respect to an electrical discharge region from the high voltage electrode to a surface of the treatment target water on the flowing water portion, and the gas flow intersects an extension direction of the high voltage electrode and intersects with an extension direction of the electrical discharge forming from the high voltage electrode to the surface of the treatment target water on the flowing water portion.

* * * * *